(12) United States Patent
Cotanis et al.

(10) Patent No.: US 9,113,353 B1
(45) Date of Patent: Aug. 18, 2015

(54) METHODS AND APPARATUS FOR IMPROVING COVERAGE AND CAPACITY IN A WIRELESS NETWORK

(71) Applicant: REVERB NETWORKS, INC., Sterling, VA (US)

(72) Inventors: Nicolae G. Cotanis, Warrenton, VA (US); Hyoung Suk Jeon, Fairfax, VA (US)

(73) Assignee: Reverb Networks, Inc., Sterling, VA (US)

( * ) Notice: Subject to any disclaimer, the term of this patent is extended or adjusted under 35 U.S.C. 154(b) by 0 days.

(21) Appl. No.: 14/634,316

(22) Filed: Feb. 27, 2015

(51) Int. Cl.
| | |
|---|---|
| *H04M 11/00* | (2006.01) |
| *H04W 24/02* | (2009.01) |
| *H04W 16/18* | (2009.01) |
| *H04W 52/34* | (2009.01) |
| *H04W 24/08* | (2009.01) |
| *H04W 16/00* | (2009.01) |

(52) U.S. Cl.
CPC .............. *H04W 24/02* (2013.01); *H04W 16/18* (2013.01); *H04W 16/00* (2013.01); *H04W 24/08* (2013.01); *H04W 52/343* (2013.01)

(58) Field of Classification Search
CPC ..... H04W 24/08; H04W 16/00; H04W 16/18; H04W 52/343
USPC ........................................ 455/421, 422.1, 446
See application file for complete search history.

(56) References Cited

U.S. PATENT DOCUMENTS

| | | |
|---|---|---|
| 5,425,051 A | 6/1995 | Mahany |
| 5,796,722 A | 8/1998 | Kotzin et al. |
| 5,802,144 A | 9/1998 | Laird et al. |
| 5,859,839 A | 1/1999 | Ahlenius et al. |
| 5,873,040 A | 2/1999 | Dunn et al. |
| 6,051,408 A | 4/2000 | Bartsch et al. |

(Continued)

FOREIGN PATENT DOCUMENTS

| | | |
|---|---|---|
| EP | 2129175 | 12/2010 |
| EP | 1952657 | 8/2011 |

(Continued)

OTHER PUBLICATIONS

Amirijoo et al., "Cell Outage Management in LTE Networks," COST 2100 TD(9)941, Vienna, Austria, Sep. 28-30, 2009.

(Continued)

*Primary Examiner* — Charles Appiah
*Assistant Examiner* — Jaime Holliday
(74) *Attorney, Agent, or Firm* — Cooley LLP

(57) ABSTRACT

A non-transitory processor-readable medium stores code to cause a processor to receive a performance indicator associated with a first mode. The code causes the processor to calculate, using the performance indicator associated with the first mode, a first metric value associated with a first metric and an objective of the first mode. The code causes the processor to calculate, using the first metric value, a second metric value associated with a second metric and an objective of a second mode. The second metric value partially compensates for a change in a performance indicator associated with the second mode when the first metric value is implemented. The code causes the processor to send a signal associated with the first metric value and a signal associated with the second metric value to an antenna module such that the antenna module implements the first metric value and the second metric value.

21 Claims, 9 Drawing Sheets

(56) References Cited

U.S. PATENT DOCUMENTS

| | | |
|---|---|---|
| 6,069,871 A | 5/2000 | Sharma et al. |
| 6,115,393 A | 9/2000 | Engel et al. |
| 6,138,016 A | 10/2000 | Kulkarni et al. |
| 6,141,565 A | 10/2000 | Feuerstein et al. |
| 6,253,077 B1 | 6/2001 | Burt et al. |
| 6,304,556 B1 | 10/2001 | Haas |
| 6,400,335 B1 | 6/2002 | Weaver et al. |
| 6,400,355 B1 | 6/2002 | Pin-Chien |
| 6,545,690 B1 | 4/2003 | Hernandez |
| 6,549,529 B1 | 4/2003 | Drabeck et al. |
| 6,574,477 B1 | 6/2003 | Rathunde |
| 6,729,929 B1 | 5/2004 | Sayers et al. |
| 6,829,491 B1 | 12/2004 | Yea et al. |
| 6,842,431 B2 | 1/2005 | Clarkson et al. |
| 6,937,863 B1 | 8/2005 | Gordon et al. |
| 6,985,704 B2 | 1/2006 | Yang et al. |
| 6,999,766 B1 | 2/2006 | Padovani |
| 7,006,805 B1 | 2/2006 | Sorrells et al. |
| 7,016,685 B1 | 3/2006 | Cain et al. |
| 7,149,478 B2 | 12/2006 | Hawe |
| 7,221,928 B2 | 5/2007 | Laird et al. |
| 7,260,415 B1 | 8/2007 | Oh |
| 7,313,402 B1 | 12/2007 | Rahman |
| 7,323,945 B2 | 1/2008 | Cyr et al. |
| 7,349,765 B2 | 3/2008 | Reaume et al. |
| 7,353,160 B2 | 4/2008 | Voigt |
| 7,385,503 B1 | 6/2008 | Wells et al. |
| 7,461,037 B2 | 12/2008 | Hätönen et al. |
| 7,477,920 B2 | 1/2009 | Scheinert et al. |
| 7,505,010 B2 | 3/2009 | Franzon et al. |
| 7,519,860 B2 | 4/2009 | Hätönen et al. |
| 7,529,215 B2 | 5/2009 | Osterling |
| 7,561,876 B2 | 7/2009 | Chiou et al. |
| 7,567,822 B2 | 7/2009 | Hart et al. |
| 7,577,103 B2 | 8/2009 | Diaz et al. |
| 7,590,589 B2 | 9/2009 | Hoffberg |
| 7,606,287 B2 | 10/2009 | Mahany |
| 7,609,747 B2 | 10/2009 | Mahany |
| 7,623,455 B2 | 11/2009 | Hilla et al. |
| 7,653,407 B2 | 1/2010 | Backes et al. |
| 7,663,555 B2 | 2/2010 | Caimi et al. |
| 7,747,712 B2 | 6/2010 | Petersen et al. |
| 7,757,103 B2 | 7/2010 | Savransky et al. |
| 7,768,968 B2 | 8/2010 | Plehn et al. |
| 7,827,268 B2 | 11/2010 | Monier et al. |
| 7,839,882 B2 | 11/2010 | Soliman |
| 7,877,095 B2 | 1/2011 | Hubner et al. |
| 7,877,108 B2 | 1/2011 | Wengerter et al. |
| 7,899,890 B2 | 3/2011 | Petersen et al. |
| 7,904,080 B2 | 3/2011 | Atkins et al. |
| 7,941,136 B2 | 5/2011 | Reed et al. |
| 7,969,896 B2 | 6/2011 | Sheinfeld et al. |
| 8,010,469 B2 | 8/2011 | Kapoor et al. |
| 8,018,925 B2 | 9/2011 | Noriega |
| 8,023,529 B2 | 9/2011 | Oh et al. |
| 8,032,131 B2 | 10/2011 | Dobson et al. |
| 8,045,996 B2 | 10/2011 | Brunner et al. |
| 8,050,191 B2 | 11/2011 | Tirpak et al. |
| 8,117,294 B2 | 2/2012 | Pollakowski et al. |
| 8,144,619 B2 | 3/2012 | Hoffberg |
| 8,159,932 B1 | 4/2012 | Hart et al. |
| 8,185,124 B2 | 5/2012 | Antic et al. |
| 8,208,924 B2 | 6/2012 | Han et al. |
| 8,295,877 B2 | 10/2012 | Hui et al. |
| 8,320,850 B1 | 11/2012 | Khlat |
| 8,355,728 B2 | 1/2013 | Jung et al. |
| 8,385,900 B2 | 2/2013 | Trigui |
| 8,509,762 B2 | 8/2013 | Li et al. |
| 8,626,075 B2 | 1/2014 | Turk et al. |
| 8,665,835 B2 | 3/2014 | Hussein et al. |
| 2002/0056066 A1 | 5/2002 | Gesbert et al. |
| 2003/0100344 A1 | 5/2003 | Garmonev et al. |
| 2003/0191856 A1 | 10/2003 | Lewis et al. |
| 2003/0228857 A1 | 12/2003 | Maeki |
| 2003/0229478 A1 | 12/2003 | Rappaport et al. |
| 2004/0018839 A1 | 1/2004 | Andric et al. |
| 2004/0042473 A1 | 3/2004 | Park et al. |
| 2004/0117226 A1 | 6/2004 | Laiho et al. |
| 2004/0196834 A1 | 10/2004 | Ofek et al. |
| 2004/0229621 A1 | 11/2004 | Misra |
| 2004/0248589 A1 | 12/2004 | Gwon et al. |
| 2004/0266442 A1 | 12/2004 | Flanagan et al. |
| 2005/0009531 A1 | 1/2005 | Lindquist et al. |
| 2005/0054339 A1 | 3/2005 | Merritt |
| 2005/0064844 A1 | 3/2005 | McAvoy |
| 2005/0111630 A1 | 5/2005 | Potorny et al. |
| 2005/0176440 A1 | 8/2005 | Sang et al. |
| 2005/0243723 A1 | 11/2005 | Randriamsay |
| 2005/0259571 A1 | 11/2005 | Battou |
| 2005/0267677 A1 | 12/2005 | Poykko et al. |
| 2005/0272444 A1 | 12/2005 | Heffield et al. |
| 2005/0277444 A1 | 12/2005 | Rensburg et al. |
| 2006/0083170 A1 | 4/2006 | Silva et al. |
| 2006/0221886 A1 | 10/2006 | Rao |
| 2006/0239224 A1 | 10/2006 | Borst et al. |
| 2006/0246844 A1 | 11/2006 | Kroboth et al. |
| 2007/0002765 A1 | 1/2007 | Kadaba et al. |
| 2007/0021151 A1 | 1/2007 | Mori et al. |
| 2007/0066298 A1 | 3/2007 | Hurst |
| 2007/0087756 A1 | 4/2007 | Hoffberg |
| 2007/0094729 A1 | 4/2007 | Hoefelmeyer et al. |
| 2007/0123271 A1 | 5/2007 | Dickinson |
| 2007/0129086 A1 | 6/2007 | Toone |
| 2007/0147297 A1 | 6/2007 | Diaz et al. |
| 2007/0195721 A1 | 8/2007 | Backes et al. |
| 2007/0197215 A1 | 8/2007 | Ben-Yehuda et al. |
| 2007/0218862 A1 | 9/2007 | Tatman et al. |
| 2007/0248039 A1 | 10/2007 | Backes et al. |
| 2008/0004078 A1 | 1/2008 | Barratt et al. |
| 2008/0016198 A1 | 1/2008 | Johnston-Watt et al. |
| 2008/0020801 A1 | 1/2008 | Fesas et al. |
| 2008/0039089 A1 | 2/2008 | Berkman et al. |
| 2008/0096566 A1 | 4/2008 | Brunner et al. |
| 2008/0125142 A1 | 5/2008 | Chang-Hung |
| 2008/0130790 A1 | 6/2008 | Forenza et al. |
| 2008/0207195 A1 | 8/2008 | Ranta et al. |
| 2008/0225714 A1 | 9/2008 | Denis |
| 2008/0261622 A1 | 10/2008 | Lee et al. |
| 2008/0268833 A1 | 10/2008 | Huang et al. |
| 2008/0311924 A1 | 12/2008 | Lucidarme |
| 2009/0003236 A1 | 1/2009 | Aoyama et al. |
| 2009/0003312 A1 | 1/2009 | Velazquez et al. |
| 2009/0023477 A1 | 1/2009 | Staudte |
| 2009/0036116 A1 | 2/2009 | Kim et al. |
| 2009/0047968 A1 | 2/2009 | Gunnarsson et al. |
| 2009/0075648 A1 | 3/2009 | Reed et al. |
| 2009/0075655 A1 | 3/2009 | Dobson et al. |
| 2009/0112932 A1 | 4/2009 | Skierkowski et al. |
| 2009/0131038 A1 | 5/2009 | MacNaughtan et al. |
| 2009/0163223 A1 | 6/2009 | Casey |
| 2009/0221297 A1 | 9/2009 | Wengerter et al. |
| 2009/0227261 A1 | 9/2009 | Tiirola et al. |
| 2009/0233625 A1 | 9/2009 | Ferguson |
| 2009/0257353 A1 | 10/2009 | Song et al. |
| 2009/0264130 A1 | 10/2009 | Catovic et al. |
| 2009/0312022 A1 | 12/2009 | Viorel et al. |
| 2009/0315736 A1 | 12/2009 | Reichl et al. |
| 2009/0323530 A1 | 12/2009 | Trigui et al. |
| 2010/0002603 A1 | 1/2010 | Gupta et al. |
| 2010/0008293 A1 | 1/2010 | Gupta et al. |
| 2010/0029282 A1 | 2/2010 | Stamoulis et al. |
| 2010/0046369 A1 | 2/2010 | Zhao et al. |
| 2010/0075682 A1 | 3/2010 | del Rio-Romero |
| 2010/0103911 A1 | 4/2010 | Ji |
| 2010/0111013 A1 | 5/2010 | Chou |
| 2010/0111047 A1 | 5/2010 | Yang et al. |
| 2010/0124934 A1 | 5/2010 | Mach |
| 2010/0130194 A1 | 5/2010 | Dickey |
| 2010/0149984 A1 | 6/2010 | Kapoor et al. |
| 2010/0159936 A1 | 6/2010 | Brisebois et al. |
| 2010/0169934 A1 | 7/2010 | Kennedy |
| 2010/0190488 A1 | 7/2010 | Jung et al. |
| 2010/0203881 A1 | 8/2010 | del Rio Romero et al. |
| 2010/0214939 A1 | 8/2010 | Ryan |

(56) References Cited

U.S. PATENT DOCUMENTS

| | | |
|---|---|---|
| 2010/0216453 A1 | 8/2010 | Kallin et al. |
| 2010/0216467 A1 | 8/2010 | Ryan et al. |
| 2010/0216477 A1 | 8/2010 | Ryan |
| 2010/0232318 A1 | 9/2010 | Sarkar |
| 2010/0235285 A1 | 9/2010 | Hoffberg |
| 2010/0254344 A1 | 10/2010 | Wei et al. |
| 2010/0267397 A1 | 10/2010 | Shen et al. |
| 2010/0278161 A1 | 11/2010 | Ore et al. |
| 2010/0284303 A1 | 11/2010 | Catovic et al. |
| 2010/0299419 A1 | 11/2010 | Ramankutty et al. |
| 2010/0303174 A1 | 12/2010 | Oh et al. |
| 2010/0309799 A1 | 12/2010 | Nunzi et al. |
| 2010/0311415 A1 | 12/2010 | Hamabe et al. |
| 2010/0311421 A1 | 12/2010 | Mach |
| 2010/0325267 A1 | 12/2010 | Mishra et al. |
| 2010/0327766 A1 | 12/2010 | Recker et al. |
| 2011/0009105 A1 | 1/2011 | Lee et al. |
| 2011/0014925 A1 | 1/2011 | Antic et al. |
| 2011/0028144 A1 | 2/2011 | Catovic et al. |
| 2011/0034179 A1 | 2/2011 | David et al. |
| 2011/0044165 A1 | 2/2011 | Ni et al. |
| 2011/0045865 A1 | 2/2011 | Viering et al. |
| 2011/0059744 A1 | 3/2011 | Won et al. |
| 2011/0090820 A1 | 4/2011 | Hussein et al. |
| 2011/0092195 A1 | 4/2011 | Hussein et al. |
| 2011/0096687 A1 | 4/2011 | Dottling et al. |
| 2011/0096688 A1 | 4/2011 | Sachs et al. |
| 2011/0105139 A1 | 5/2011 | On |
| 2011/0111700 A1 | 5/2011 | Hackett |
| 2011/0130135 A1* | 6/2011 | Trigui ........................ 455/423 |
| 2011/0130146 A1 | 6/2011 | Trigui |
| 2011/0136478 A1 | 6/2011 | Trigui |
| 2011/0141972 A1 | 6/2011 | Oh et al. |
| 2011/0151881 A1 | 6/2011 | Chou et al. |
| 2011/0190016 A1 | 8/2011 | Hamabe et al. |
| 2011/0199985 A1 | 8/2011 | Cai et al. |
| 2011/0230222 A1 | 9/2011 | Reudink |
| 2011/0252477 A1 | 10/2011 | Sridhar et al. |
| 2011/0280157 A1 | 11/2011 | Suerbaum |
| 2011/0294527 A1 | 12/2011 | Brueck et al. |
| 2011/0312335 A1 | 12/2011 | Liu et al. |
| 2012/0009912 A1 | 1/2012 | Wang et al. |
| 2012/0009938 A1 | 1/2012 | Liu et al. |
| 2012/0009948 A1 | 1/2012 | Powers et al. |
| 2012/0026918 A1 | 2/2012 | Won et al. |
| 2012/0026941 A1 | 2/2012 | Ahmad et al. |
| 2012/0028584 A1 | 2/2012 | Zhang et al. |
| 2012/0028664 A1 | 2/2012 | Zhang et al. |
| 2012/0034919 A1 | 2/2012 | Nakata et al. |
| 2012/0066377 A1 | 3/2012 | Li et al. |
| 2012/0087257 A1 | 4/2012 | Larsson et al. |
| 2012/0087269 A1 | 4/2012 | Hussein et al. |
| 2012/0147765 A1 | 6/2012 | Wigren |
| 2012/0147828 A1 | 6/2012 | Wigren |
| 2012/0170478 A1 | 7/2012 | Doettling et al. |
| 2012/0182874 A1 | 7/2012 | Siomina et al. |
| 2012/0252479 A1 | 10/2012 | Morita et al. |
| 2012/0264470 A1 | 10/2012 | Bajj et al. |
| 2012/0270536 A1 | 10/2012 | Ratasuk et al. |
| 2012/0295609 A1 | 11/2012 | Li et al. |
| 2012/0327797 A1 | 12/2012 | Siomina et al. |
| 2013/0028107 A1 | 1/2013 | Ho et al. |
| 2013/0114464 A1 | 5/2013 | Tarraf et al. |
| 2013/0196650 A1* | 8/2013 | Futaki ........................ 455/424 |
| 2013/0217435 A1 | 8/2013 | Tarraf et al. |
| 2013/0229914 A1 | 9/2013 | Suerbaum |
| 2013/0242736 A1 | 9/2013 | Tarraf et al. |
| 2013/0322395 A1 | 12/2013 | Kazmi et al. |
| 2015/0011197 A1 | 1/2015 | Tarraf et al. |

FOREIGN PATENT DOCUMENTS

| | | |
|---|---|---|
| WO | WO 2007/063426 | 6/2007 |
| WO | WO 2012/072445 | 6/2012 |

OTHER PUBLICATIONS

Blume et al., "Energy Savings in Mobile Networks Based on Adaptation to Traffic Statistics," Bell Labs Technical Journal 15(2):77-94 (2010) © 2010 Alcatel-Lucent.

Lehtimaki et al., "A SOM Based Approach for Visualization of GSM Network Performance Data," Helsinki University of Technology (2005).

Mueller et al., "A Cell Outage Detection Algorithm Using Neighbor Cell List Reports," Springer-Verlag Berlin Heidelberg (2008).

"Self-Optimizing Networks: The Benefits of SON in LTE," 4G Americas (Jul. 2011).

* cited by examiner

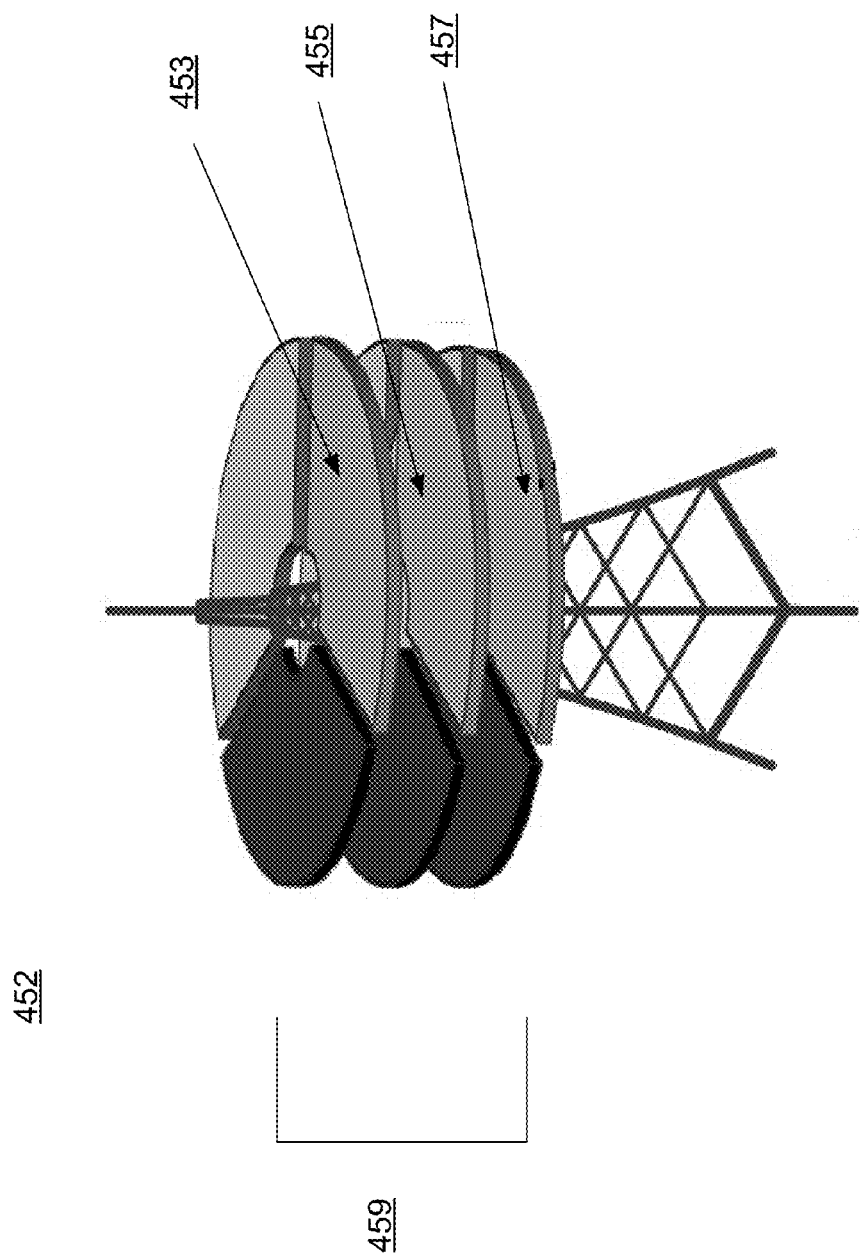

METHODS AND APPARATUS FOR IMPROVING COVERAGE AND CAPACITY IN A WIRELESS NETWORK

BACKGROUND

Some embodiments described herein relate generally to optimizing wireless networks, and in particular, to methods and apparatus for improving coverage and capacity in wireless networks by automatically reconfiguring transmit power and antenna tilt of multiple network elements.

Some known wireless networks implement an automated system for network optimization, which adjust radio resources and network parameters to improve the overall network performance. Such systems, however, typically are not designed to continuously optimize coverage and capacity within the wireless network by automatically reconfiguring transmit power and antenna tilt of multiple network elements while limiting any decrease in network performance (e.g., due to interference between two antenna cells). Further, some known network optimization systems fail to suitably react and readjust to differences between planned coverage and capacity and actual (in use) coverage and capacity.

Accordingly, a need exists for methods and apparatus for automatically reconfiguring transmit power and antenna tilt of one or more network elements to improve the overall network performance of the wireless network.

SUMMARY

A non-transitory processor-readable medium stores code to cause a processor to receive, at a first time, a value associated with each key performance indicator from a set of key performance indicators associated with a wireless network. In some instances, a key performance indicator can be associated with, for example, a drop call rate. The code stored in the medium includes code to cause the processor to identify, based on the value associated with each key performance indicator from the set of key performance indicators, a geographic area having a network performance problem at the first time. The code stored in the medium includes code to cause the processor to send, in response to identifying the network performance problem and to a down cell detection module, an inactive cell request to identify inactive antenna cells from a set of antenna cells associated with the geographic area. The code stored in the medium includes code to cause the processor to receive in response to the inactive cell request an indication that each antenna cell from the set of antenna cells is active. The code stored in the medium includes code to cause the processor to send, in response to the geographic area having the network performance problem at the first time, a neighbor relation update request for each antenna cell from the set of antenna cells to update at a second time after the first time a neighbor list associated with that antenna cell. The code stored in the medium includes code to cause the processor to classify the network performance problem as a coverage hole in response to identifying the network performance problem at a third time. The third time is a predetermined time after the second time.

BRIEF DESCRIPTION OF THE DRAWINGS

FIG. 4 illustrates an example of antenna 152 having three antenna cells and associated coverage areas propagating therefrom, according to an embodiment.

DETAILED DESCRIPTION

Figure 1:
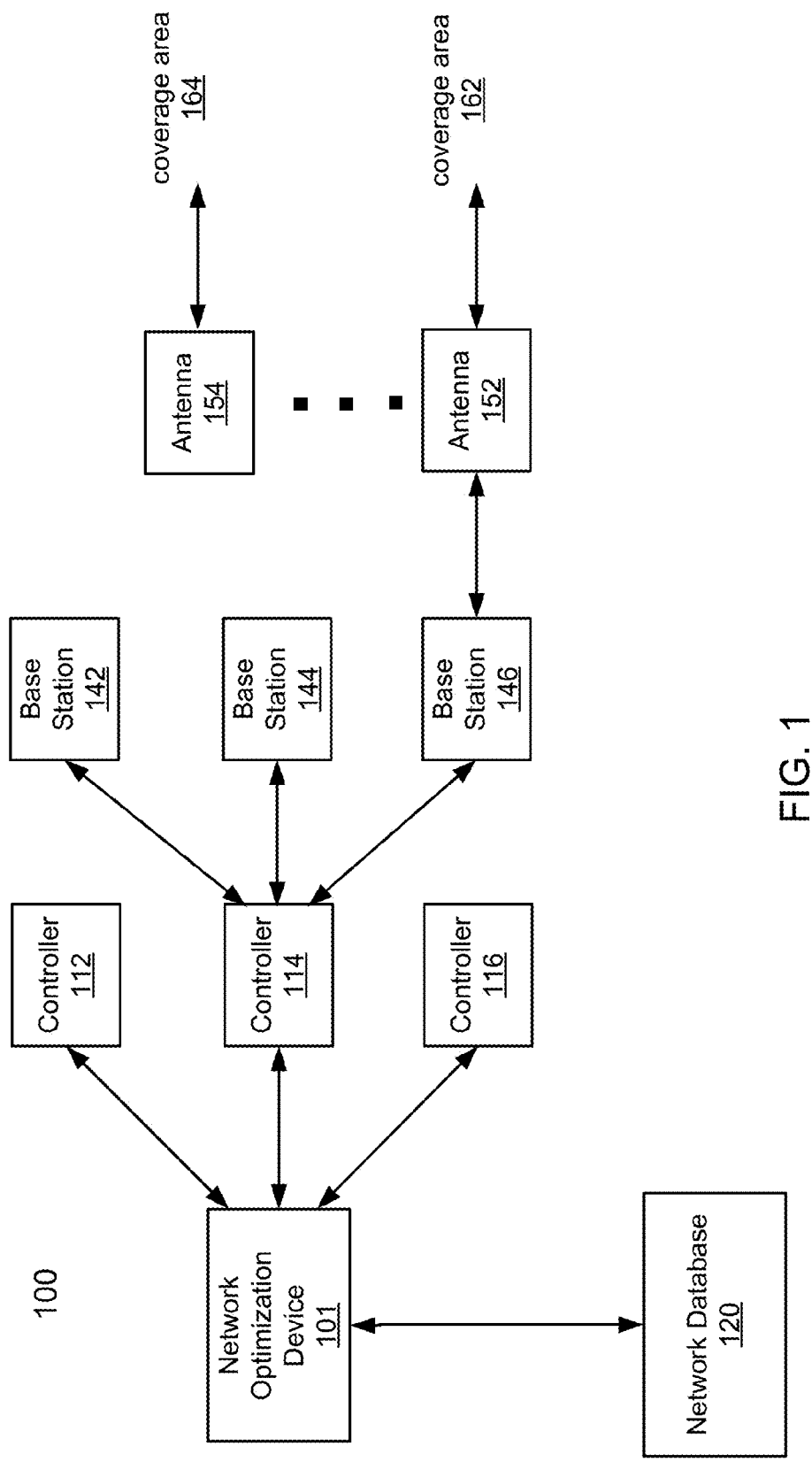
FIG. 1 is a schematic diagram that illustrates a wireless network, according to an embodiment.

In some embodiments, an apparatus includes a coverage hole detection module implemented in at least one of a memory or a processing device. The coverage hole detection module is configured to receive, at a first time, a value associated with each key performance indicator from a set of key performance indicators associated with a wireless network. In some instances, a key performance indicator can be associated with, for example, a drop call rate, an indication of received signal power at a set of user devices, an estimate of propagation time between the set of user devices and an access point associated with an antenna cell from the plurality of antenna cells, available resources at a set of user devices, a radio resource utilization rate at an antenna cell, and/or an indication of devices changing technology within the geographic area The coverage hole detection module is configured to identify, based on the value associated with each key performance indicator from the set of key performance indicators, a geographic area having a network performance problem at the first time. The coverage hole detection module is configured to send, in response to identifying the network performance problem and to a down cell detection module, an inactive cell request to identify inactive antenna cells from a set of antenna cells associated with the geographic area. The coverage hole detection module is configured to receive, from the down cell detection module and in response to the inactive cell request, an indication that each antenna cell from the set of antenna cells is active. The coverage hole detection module is configured to send, in response to the geographic area having the network performance problem at the first time and to a neighbor relation module, a neighbor relation update request for each antenna cell from the set of antenna cells to update at a second time after the first time a neighbor list associated with that antenna cell. The coverage hole detection module is configured to classify the network performance problem as a coverage hole in response to the coverage hole detection module identifying the network performance problem at a third time. The third time is a predetermined time after the second time.

In some embodiments, an apparatus includes a coverage hole mitigation module implemented in at least one of a memory or a processing device. The coverage hole mitigation module is configured to receive an indication of a coverage hole within a geographic area and associated with multiple antenna cells associated with an antenna. The coverage hole mitigation module is configured to identify a first antenna cell (1) from the multiple antenna cells and (2) to use to mitigate the coverage hole. The coverage hole mitigation module is configured to send a signal to change a tilt of the antenna from a first position to a second position at a first time. The coverage hole mitigation module is configured to send, at a second time after the first time, a signal to increase power of the first antenna cell from a first power level to a second power level in response to at least one of (1) an adverse effect on a coverage area associated with a second antenna cell from the multiple antenna cells and during a predetermined time period after the first time, or (2) a limit associated with the tilt of the antenna.

The code stored in the medium includes code to cause the processor to further analyze, periodically and upon expiration of a detection timer for a wireless network, a first value of each key performance indicator from a set of key performance indicators for the wireless network. The code stored in the medium includes code to cause the processor to identify, based on the first value associated with at least one key performance indicator from the set of key performance indicators, a geographic area having a network performance problem at a time. The code stored in the medium includes code to cause the processor to send, in response to the geographic area having the coverage network performance problem at the time, a neighbor relation request to update a neighbor list associated with at least one antenna cell from a set of antenna cells associated with the geographic area. The code stored in the medium includes code to cause the processor to initiate a neighbor relation timer associated with the at least one antenna cell based on sending the neighbor relation request. The code stored in the medium includes code to cause the processor to, upon expiration of the neighbor relation timer, identify the network performance problem as a coverage hole if a second value associated with the at least one key performance indicator does not meet a predetermined criterion. The code stored in the medium includes code to cause the processor to send, in response to identifying the network performance problem as a coverage hole, a signal to modify at least one of a power associated with the at least one antenna cell from the set of antenna cells or a tilt of an antenna including the at least one antenna cell from the set of antenna cells. The code stored in the medium includes code to cause the processor to initiate a monitor timer and an action timer for the antenna in relation to the signal to modify at least one of the power or the antenna tilt. The code stored in the medium includes code to cause the processor to, upon expiration of the monitor timer, receive a third value of each key performance indicator from the set of key performance indicators and determine improvement or decrease in performance associated with the antenna based on the third value of the at least one key performance indicator from the set of key performance indicators. The code stored in the medium includes code to cause the processor to, upon expiration of the action timer, send a signal to further modify at least one of the power associated with the at least one antenna cell from the set of antenna cells or the tilt of the antenna if a fourth value of the at least one key performance indicator from the set of key performance indicators meets a predetermined criterion.

As used herein, an antenna can be any device or component that can radiate, transmit, and/or receive signals (e.g., electromagnetic and/or radio waves). For example, an antenna can include an element or device for transmitting and/or receiving radio frequency signals within a communications network.

As used herein, an antenna cell can be a portion of an antenna, associated circuitry and/or associated component(s) that defines a coverage area for a particular frequency, technology ($3^{rd}$ Generation (3G)), geographic area, and/or power level. A perimeter of the coverage area can be defined at least in part by the antenna cell. Further, the antenna cell can define at least in part an effective operating range for transmitting and receiving signals. In some embodiments, an antenna cell, and its associated circuitry and/or components, can be associated with a particular radio frequency, a particular technology (Long Term Evolution (LTE)), and/or a particular provider of such services. In some embodiments, multiple antenna cells can be associated with a common antenna. An antenna cell can also be referred to as an antenna portion.

As used herein, a coverage area can be an area defined by an effective operating range of a transmitter and/or antenna cell. Outside of the coverage area, for example, can be an ineffective operation range of the transmitter and/or the antenna cell associated with the coverage area. Each coverage area can be associated with a particular antenna cell. Further, a coverage area, or a perimeter thereof, can be modified by modifying configuration parameters of the antenna cell associated with that coverage area (e.g., by modifying tilt and/or power).

As used herein, an antenna sector can be multiple antenna cells associated with a common antenna. For example, an antenna sector can include a first antenna cell (e.g., associated with a first technology or frequency) and a second antenna cell (e.g., associated with a second technology or frequency). For example, each antenna cell of an antenna can be within a common antenna sector.

As used herein, a module can be, for example, any assembly and/or set of operatively-coupled electrical components associated with performing a specific function, and can include, for example, a memory, a processor, electrical traces, optical connectors, software (executing in hardware) and/or the like. As used herein, the singular forms "a," "an" and "the" include plural referents unless the context clearly dictates otherwise. Thus, for example, the term "a coverage hole detection module" is intended to mean a single module or a combination of modules configured to perform coverage hole detection functions.

FIG. 1 is a schematic diagram that illustrates a wireless network 100, according to an embodiment. The wireless network 100 can be similar to the wireless networks shown and described in U.S. Patent Application Publication No. 2009/0323530, filed Apr. 17, 2009 and entitled "Dynamic Load Balancing," U.S. Patent Application Publication No. 2011/0090820, filed Oct. 16, 2009 and entitled "Self-Optimizing Wireless Network," U.S. Provisional Patent Application Ser. No. 61/532,850, filed Sep. 9, 2011 and entitled "Self Optimizing-Organizing Network Manager," and U.S. patent application Ser. No. 13/353,893, filed Jan. 19, 2012 and entitled "Methods and Apparatus for Underperforming Cell Detection and Recovery in a Wireless Network," each of which is incorporated herein by reference in its entirety.

Specifically, the wireless network 100 can be any network that enables wireless communication devices (e.g., cellular phones, Wi-Fi enabled laptops, Bluetooth devices, mobile devices, etc.) to communicate with each other. In some embodiments, the wireless network 100 can be implemented and administered using wireless transmission such as radio frequency (RF) waves. For example, the wireless network 100 can be a cellular network that enables two cellular phones to communicate with each other. For another example, the wireless network 100 can be a Wi-Fi network that enables multiple Wi-Fi enabled laptops to be operatively connected.

In some embodiments, the wireless network 100 can be at least a portion of, for example, a wireless local area network (WLAN), a wireless mesh network, a wireless metropolitan area network (MAN), a wireless wide area network (WAN), a mobile device network (e.g., a global system for mobile communications (GSM) network, a personal communications service (PCS) network), a radio access network (RAN), a long term evolution (LTE) network, a Universal Mobile Telecommunications System (UMTS) network, and/or the like.

As shown in FIG. 1, the wireless network 100 includes a network optimization device 101, a network database 120, one or more controllers (e.g., controllers 112, 114, 116), and one or more network elements such as base stations (e.g., base stations 142, 144, 146) for supporting data communication between subscriber devices (not shown in FIG. 1) distributed throughout coverage areas (e.g., coverage areas 162, 164) defined or established by the wireless network 100 via one or more antennas (e.g., antennas 152, 154 and/or one or more antenna cells of each antenna 152, 154).

The network optimization device 101 is operatively coupled to the network database 120. The network optimization device 101 is also operatively coupled to and configured to manage the one or more controllers (e.g., controllers 112, 114 and 116). Each controller (e.g., the controller 114) is operatively coupled to and configured to manage one or more network elements (e.g., base stations 142, 144 and 146). A controller can be any device that is capable of sending control signals (e.g., commands, instructions, requests, etc.) to the network element(s) controlled by that controller, thus managing operations of the network element(s). In some embodiments, a controller can be, for example, a server or similar computer device. In some embodiments, a controller can also be considered a network element of the wireless network 100.

A network element (e.g., the base station 142, 144 or 146) controlled by a controller (e.g., the controller 114) can be any device, component, subsystem, or infrastructure that can be wirelessly coupled to and communicate with one or more wireless communication devices (e.g., communication devices of subscribers to the wireless network 100). In some embodiments, such a network element (e.g., the base station 146) can be equipped with and configured to control one or more antennas (e.g., the antennas 152 and 154 and/or antenna cell(s) of each antenna), which can be used to support data communications (e.g., transmit data to and/or receive data from) between that network element and the wireless communication devices (not shown in FIG. 1) that are distributed throughout a coverage area(s) (or sector(s)) associated with those antennas). For example, as shown in FIG. 1, the antenna 152 can support data communications between the base station 146 and wireless communication devices distributed within the coverage area 162; the antenna 154 can support data communications between a base station where the antenna 154 is located and wireless communication devices distributed within the coverage area 164. In some embodiments, a network element (e.g., base station) controlled by a controller can be located at, for example, a cell site.

In some embodiments, the connections between the network optimization device 101 and the one or more controllers (e.g., the controllers 112, 114 and 116) and the network database 120 can include, for example, a wireless connection, a wired connection, and/or a combination of wireless and wired connections. Similarly, the connections between each controller (e.g., the controller 114) and its associated network element(s) (e.g., the base stations 142, 144 and 146) can include, for example, a wireless connection, a wired connection and/or a combination of wireless and wired connections.

The network database 120 can be implemented in a memory or other storage device that is part of the network optimization device 101 or another device operatively coupled to the network optimization device 101. The network database 120 can be configured to receive and store information and/or data associated with the wireless network 100, such as network statistics, current network configurations, and performance indicators of the wireless network 100. Furthermore, the network database 120 can be configured to provide or send the stored information and/or data to the network optimization device 101. The information and/or data can be used at the network optimization device 101 to monitor, optimize or improve network performance of the wireless network 100, as described in detail with respect to FIGS. 2-9. Such information and/or data can include, but not limited to, key performance indicators (KPIs) such as transmitted radio power level value of a coverage area, an indication of received signal power at a set of user devices (e.g., set of wireless communication devices), a successful call rate (SCR) value of a cell, traffic statistical values associated with a cell, handover statistical values associated with a cell, a drop call rate (DCR) value associated with a cell, an estimate of propagation time between a set of user device and an access point associated with an antenna cell, available resources at an access point, available resources at the set of user devices, a radio resource utilization rate, a radio resource utilization rate at the access point, an indication of devices changing technology (discussed in further detail herein, particularly with reference to FIG. 5) within a geographic area and/or the like. One example of a change of technology includes changing from evolved universal terrestrial radio access network (E-UTRAN) coverage or long term evolution (LTE) coverage to 2G or 3G coverage. While shown in FIG. 1 as being located on a single device, in some embodiments, the functionality of the network database 120 can be distributed to multiple devices (e.g., multiple databases) across the wireless network 100.

The network optimization device 101 can be any device configured to control, monitor, coordinate and/or execute one or more optimization processes (e.g., hardware processes and/or software processes executed in hardware) for performing optimization of network parameters (e.g., coverage, capacity, interference, etc.) in the wireless network 100. In some embodiments, the network optimization device 101 can be, for example, a compute device, a server device, an application server, a mobile device, a workstation, and/or the like. As shown in FIG. 1, the network optimization device 101 can be directly or operatively coupled to the remaining devices within the wireless network 100. Specifically, the network optimization device 101 can be operatively coupled to the network elements (e.g., the base stations 142, 144 and 146) via one or multiple intermediate modules and/or devices such as, for example, a controller (e.g., the controller 112, 114 or 116) and/or the like. In some embodiments, the network optimization device 101 can be coupled to the remaining devices of the wireless network 100 via any suitable connecting mechanism such as, for example, optical connections (e.g., optical cables and optical connectors), electrical connections (e.g., electrical cables and electrical connectors), wireless connections (e.g., wireless transceivers and antennas), and/or the like. Furthermore, while shown in FIG. 1 as a single device, in some embodiments, the functionality of the network optimization device 101 can be distributed to multiple devices (e.g., multiple servers) across the wireless network 100.

Figure 2:
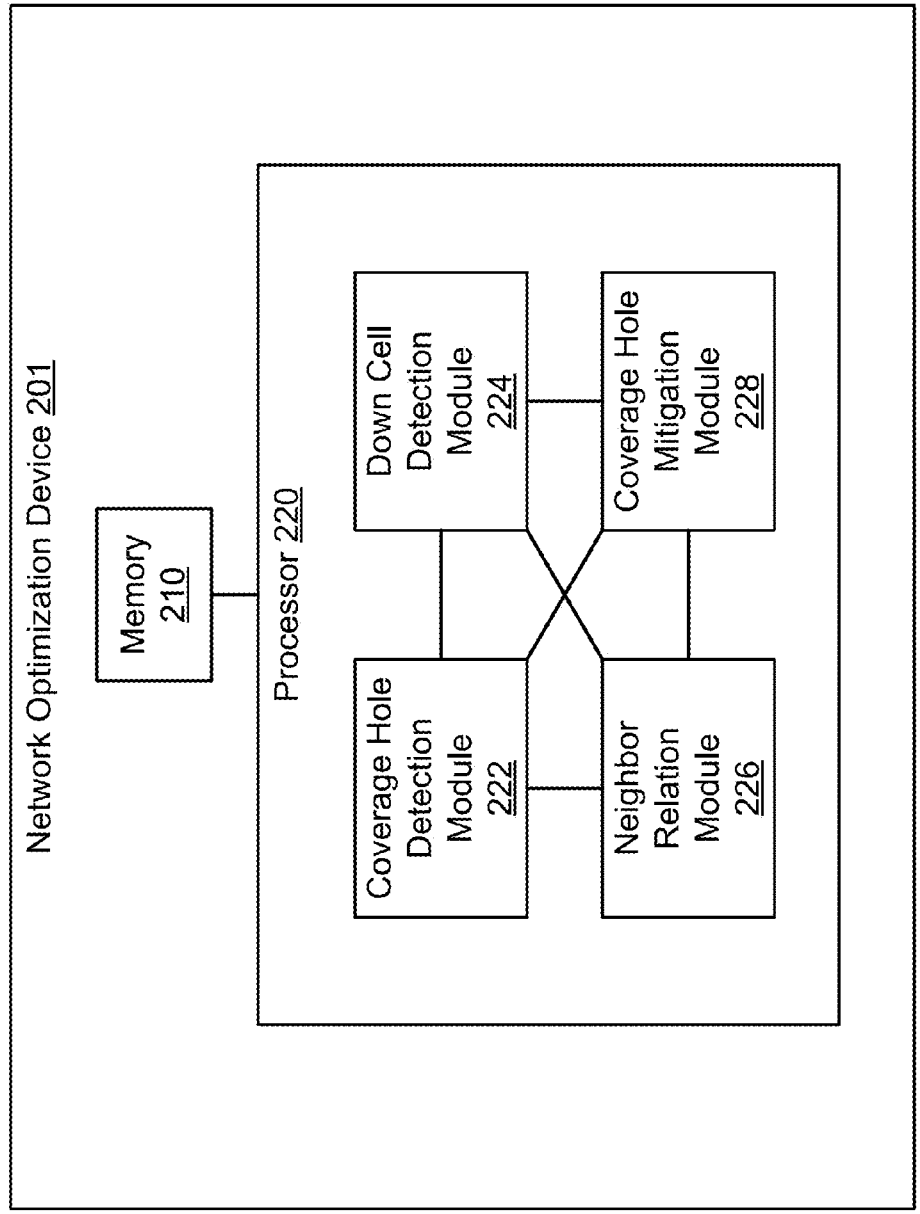
FIG. 2 is a block diagram of a network optimization device configured to improve coverage and capacity in a wireless network, according to an embodiment.
Figure 3A:
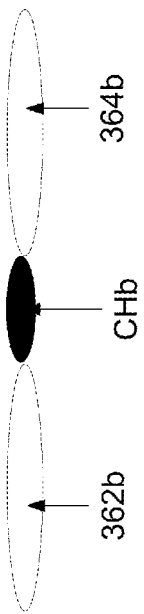
FIGS. 3(a)-3(d) illustrate antenna coverage maps with coverage holes having varying bases of identification for a wireless network, according to an embodiment.
Figure 3B:
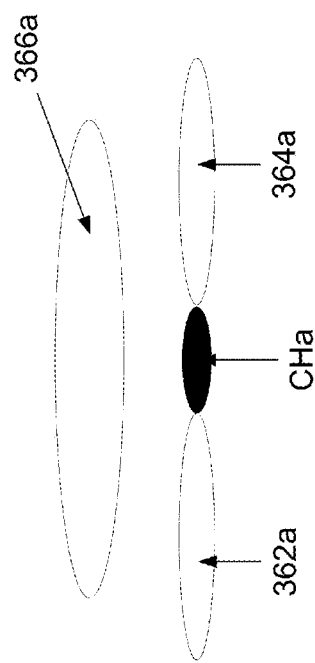
Figure 3C:
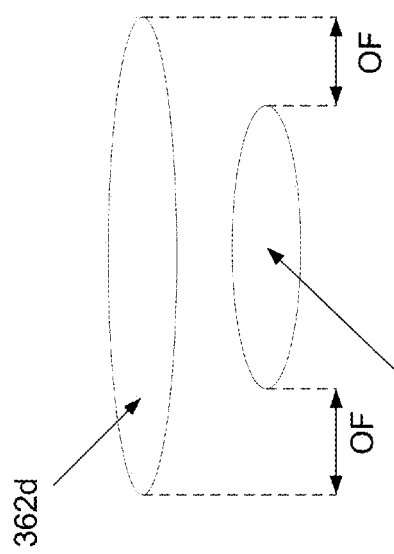
Figure 3D:
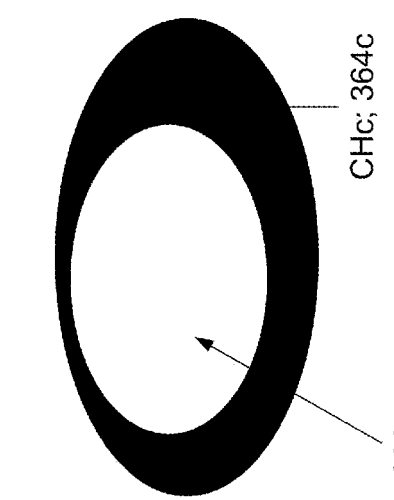

In some embodiments, the process for improving and/or optimizing coverage and capacity in the wireless network 100 can be executed at a processor of the network optimization device 101. FIG. 2 illustrates a block diagram of a network optimization device configured to coordinate and/or execute improvement and/or optimization in a wireless network, according to an embodiment. The network optimization device 201 shown in FIG. 2 can be structurally and functionally similar to the network optimization device 101 shown and described with respect to FIG. 1. The network optimization device 201 can be included in a wireless network similar to the wireless network 100 shown and described with respect to FIG. 1.

As shown in FIG. 2, the network optimization device 201 includes at least a memory 210 and a processor 220. Although not shown in FIG. 2, the network optimization device 201 can include other components such as one or more communication ports, a user interface and/or the like. The memory 210 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 210 can store instructions to cause the processor 220 to execute modules (e.g., coverage hold detection module 222), processes and/or functions associated with the network optimization device 201, the network database (e.g., network database 120 as shown in FIG. 1) and/or other suitable components or modules within the wireless network 200. In some instances, the network optimization device 201 can be a single physical device. In other instances, the modules and/or functions of the network optimization device 201 can be distributed to multiple physical devices, each of which can include one or multiple modules (shown in FIG. 2) and/or other components (not shown in FIG. 2).

As shown in FIG. 2, the processor 220 includes a coverage hole detection module 222, a neighbor relation module 226, a down cell detection module 224 and a coverage hole mitigation module 228, each of which can be operatively coupled to the other modules. In some embodiments, the processor 220 can include more or less modules than shown in FIG. 2. Each module in the processor 220 can be any combination of a hardware-based module (e.g., a field-programmable gate array (FPGA), an application specific integrated circuit (ASIC), a digital signal processor (DSP)) and/or software-based module (e.g., a module of computer code stored in memory and/or executed at the processor 220) capable of performing one or more specific functions associated with that module. The processor 220 can be any suitable processor configured to run and/or execute the modules 222, 224, 226, 228.

As will be discussed in further detail herein, the coverage hole detection module 222, the down cell detection module 224, the neighbor relation module 226 and the coverage hole mitigate module 228 can cooperatively function to identify coverage holes from network performance problems, mitigate the coverage holes while reducing and/or minimizing potential detriment or interference within the wireless network resulting from such mitigation, and monitor actual performance during and after mitigation.

FIGS. 3(*a*)-3(*d*) illustrate antenna coverage maps with coverage holes having varying bases of identification and degrees of insufficient coverage and capacity. First, FIG. 3(*a*) illustrates a coverage map having a coverage hole CHa identifiable based at least in part on an indication of a change of technology. As shown, coverage hole CHa is located between a first coverage area 362*a* established by a first antenna cell (not shown), and a second coverage area 364*a* established by a second antenna cell (not shown). In this example, both the first coverage area 362*a* and the second coverage area 364*a* are of a first technology (e.g., E-UTRAN). Further, the coverage map has a third coverage area 366*a* overlapping the coverage hole CHa and having a second technology (e.g., $3^{rd}$ Generation (3G)) different than the first technology. In operation, for example, although a subscriber device (not shown) located within the coverage hole CHa may not experience a loss of service (e.g., a dropped call or inability to connect), it may experience a change of technology (i.e., change from operating via E-UTRAN in the first coverage area 262*a* or the second coverage area 364*a*, to operating via 3G in the third coverage area 366*a*). Such a change can indicate the possibility of a coverage hole in the service of the first technology (e.g., E-UTRAN).

FIG. 3(*b*) illustrates an antenna coverage map with a coverage hole CHb identifiable based at least in part on a drop call rate. As shown, coverage hole CHb is located between a first coverage area 362*b* established by a first antenna cell (not shown), and a second coverage area 364*b* established by a second antenna cell (not shown). In operation, as subscriber devices move into or are otherwise disposed within the coverage hole CHb, drop call rates associated with coverage area 362*b* and/or coverage area 364*b* will be present, or increase, thereby indicating the possibility of a coverage hole.

FIG. 3(*c*) illustrates an antenna coverage map with an "isolated island" coverage hole CHc identifiable based at least in part on a drop call rate or a lower than expected use rate. As shown, coverage hole CHc is defined in part by an expected or designed coverage area 364*c*, that surrounds an actual coverage area 362*c*. Similarly stated, the actual coverage area 362*c* is smaller than the expected or designed coverage area 36*c*, thereby defining the coverage hole CHc therebetween. Here, subscriber devices (not shown) moving from actual coverage area 362*c* to designed coverage area 364*c* will experience interruption in service (e.g., a dropped call). In some instances, a usage rate associated with the actual coverage area 362*c* can be lower than an expected usage rate based on or associated with the designed coverage area 364*c*

FIG. 3(*d*) illustrates an antenna coverage map experiencing overshooting, and thus potential interference issues and/or capacity issues with neighbor antennas and/or antenna cells. As shown, the wireless system includes an actual coverage area 362*d* surrounding or overflowing a planned coverage area 364*d*. Such overflow OF can be identified based on interference by or to neighbor antenna cells. In addition, such overflow can result in overcrowding of a coverage area 362*d*. Overcrowding by subscriber devices (not shown) of a coverage area, in some instances, can result in capacity challenges. Similarly stated, a number of subscriber devices (not shown) may seek to communicate with an antenna—that number being greater than a designed capacity of that antenna/service.

FIG. 4 illustrates an example of the antenna 452 having three antenna cells propagating therefrom, according to an embodiment. As shown, the antenna 452 includes a first carrier established coverage area 453, a second carrier established coverage area 455, and a third carrier established coverage area 457, each of which is categorized within a common sector 459. As will be discussed further herein, an antenna such as antenna 452 can have its configuration modified as part of a capacity and coverage optimization (CCO) action process. In some embodiments, the CCO action process can include modifying a tilt of the antenna 452, modifying a power associated with the antenna cell of the antenna 452, or any suitable combination thereof. In some embodiments, such modifications can be incremental and coupled with dynamic monitoring processes as will be discussed in further detail herein. As shown in FIG. 4, antenna cell 453, antenna cell 455, and antenna cell 457 can be associated with a single antenna. As such, an antenna tilt modification will affect the three antenna cells (e.g., 453, 455, and 457) of the antenna 452. Similarly stated, in use, for example, when mitigating a coverage hole using the first antenna cell 453 by modifying the tilt of the antenna 452, a coverage area of the second antenna cell 455 and a coverage area of the third antenna cell 457 will also be affected. Thus, in some embodiments where a CCO action includes modifying an antenna tilt, an effect on each antenna cell associated with that antenna should be considered.

Referring back to FIGS. 1 and 2, in operation, the network optimization module 201 can, based at least in part on one or more key performance indicators (KPIs), improve and/or optimize coverage and capacity within the network 200. In some embodiments, for example, the coverage hole detection module 222 of the network optimization device 201 can identify or detect, based on a value associated with one or more KPIs (e.g., a drop call rate, an indication of received signal power at a set of user devices, an estimate of propagation time between the set of user devices and an access point associated with an antenna cell from the plurality of antenna cells, available resources at the access point, available resources at the set of user devices, a radio resource utilization rate at the access point, an indication of devices changing technology within the geographic area, etc.), a geographic area having a network performance problem (e.g., a coverage hole, cell interference, inactive cell, inaccurate and/or outdated neighbor data, etc.). A network performance problem can include any portion of a wireless network operating at less than a desired performance level.

Before classifying or identifying a network performance problem as a coverage hole, and subsequently taking action to mitigate the coverage hole, in some embodiments, it can be desirable to eliminate or rule-out potential causes of the network performance problem. One potential cause of or contributor to a network performance problem can be an inactive antenna cell associated with the geographic area experiencing the network performance problem. For example, if a network performance problem is caused by an inactive cell, the network performance problem may be mitigated by fixing the antenna cell associated with that inactive cell. Similarly stated, if the network performance problem is caused by an inactive cell, the network performance problem will not be classified as a coverage hole. If, however, the network performance problem is not caused by an inactive cell, the network performance problem can potentially be classified as a coverage hole.

To diagnose, in some instances, the coverage hole detection module 222 can send to the down cell detection module 224 an inactive cell request to identify any inactive antenna cells associated with that geographic area. In response to the request, the down cell detection module 224 can determine and/or identify any such inactive or insufficiently functioning antenna or antenna cell(s). For example, the down cell detection module 224 can access a list of current inactive cells, and/or query one or more antenna cells, or associated components, to identify any such inactive cells. The down cell detection module 224 can then send to the coverage hole detection module a signal representing its determination or identification. Similarly stated, the coverage hole detection module 222 can receive from the down cell detection module 224 and in response to the inactive cell request, a status indication of one or more antenna or antenna cells.

Further, another potential cause of or contributor to a network performance problem is an inaccurate (or outdated) neighbor relation list. For example, if a neighbor list is not up-to-date, neighbor antenna cells, or subscriber devices in communication (or desirous of communication) therewith, may experience handover issues. Thus, in some embodiments, it can be desirable to determine whether the network performance problem is caused by or related to an inaccurate neighbor relation list. If the network performance problem is caused by an inaccurate neighbor relation list, an update to the list may improve or eliminate the network performance problem. As such, a network performance problem caused any an inaccurate neighbor relation list will not be classified as a coverage hole.

To diagnose, in some instances, the coverage hole detection module 222 can send to the neighbor relation module 226 a neighbor relation update request for one or more antenna cells in a geographic area associated with an indication of a network performance problem to update a neighbor list associated with that antenna cell. In instances in which the coverage hole detection module 222 identifies the network performance problem upon expiration of a predetermined time period after sending a neighbor relation update request, it can be assumed that the network performance problem is not caused by or related to an inaccurate neighbor list or associated handover issues. As such, in some embodiments, the coverage hole detection module 222 can classify a network performance problem as a coverage hole when each antenna cell within a particular geographic area associated with the network performance problem is active, and a neighbor list associated with each antenna cell within the geographic area is up-to-date and/or accurate.

In some instances, the coverage hole detection module 222 can receive, from the down cell detection module 224 (e.g., in response to identifying a network performance problem within a geographic area), an indication that each antenna cell associated with that geographic area is active. In response to receiving the indication, in some instances, the coverage hole detection module 222 can send to the neighbor relation module 226 a neighbor relation update request for each antenna cell within that geographic area to update a neighbor list. If the coverage hole detection module 222 subsequently (e.g., at a pre-determined time or after expiration of a pre-determined time period) identifies the network performance problem, the coverage hole detection module 222 can classify that network performance problem as a coverage hole.

Once a network performance problem has been classified as a coverage hole, the coverage hole mitigation module 228 of the network optimization device 201 can improve and/or optimize the wireless network by mitigating the coverage hole. In some embodiments, for example, the coverage hole mitigation module 228 can receive from the coverage hole detection module 222 an indication of a coverage hole within a geographic area. The indication can include an association between the coverage hole and multiple antenna cells associated with an antenna. Based upon such an indication, the coverage hole mitigation module 228 can send a signal to antennas (or associated components or devices) within the network to modify a power and/or an antenna tilt associated with one or more antenna cells.

In some instances, the coverage hole mitigation module 228 can identify (e.g., based on KPI's associated with a geographic area having a network performance problem; and/or based on a ranking (as discussed in further detail herein) associated with the antenna cell(s)) a first antenna cell (1) from the multiple antenna cells and (2) to use to mitigate the coverage hole. In some instances, it can be desirable to modify the tilt of an antenna rather than a power of the antenna to maintain or optimize balanced uplink and down-link communications between the antenna and associated subscriber devices. As such, in some instances, upon identifying the first antenna cell to use to mitigate the coverage hole, the mitigation module 228 can send a signal to the antenna (or a controller operably coupled thereto) associated with the first antenna cell to change a tilt of its associated antenna from a first position to a second position. In some instances, the tilt change can mitigate the coverage hole. Further, in some cases, (e.g., if the initial tilt change only partially mitigated the coverage hole), the coverage mitigation module 228 can send a signal to change the tilt of the antenna from the second position to a third position to further mitigate the coverage hole. In some instances, however, based on a tilt limit of the antenna (e.g., the antenna cannot change from the second position to the third position), tilt modification may not be sufficient for mitigating a coverage hole. In such instances, the coverage hole mitigation module 228 can send a signal to change a power level of the antenna cell to further mitigate the coverage hole. In this manner, tilt and power modifications can collectively mitigate the coverage hole.

In other instances, however, such a tilt change may result in no significant change or may result in an adverse effect on a coverage area associated with a second antenna cell from the multiple antenna cells. In such cases, in response to the adverse effect (e.g., identified based on one or more KPIs) on the coverage area associated with the second antenna cell during a predetermined time period after the coverage hole mitigation module 228 sent the signal to change the tilt, the coverage hole mitigation module 228 can send a signal to re-adjust the tilt of the first antenna (e.g., revert the tilt to a different configuration, or a prior configuration (from the second position to the first position)).

Upon reversion or re-adjustment of the first antenna tilt, the coverage hole mitigation module 228 can send a signal to adjust the power of the first antenna cell from a first power level to a second power level. In desirable instances, sending the signal to adjust the power of the first antenna cell from the first power level to the second power level can result in an improvement in a value of one or more KPIs. In such instances, the coverage hole mitigation module 228 can send a signal to increase the power of the first antenna cell from the second power level to a third power level. In this manner, the coverage hole mitigation module 228 can incrementally optimize the coverage and capacity within that geographic area, while continually monitoring (e.g., via KPIs) the network performance.

In other instances, however, sending the signal to adjust the power from the first power level to the second power level can produce an undesirable result or change within the wireless network 200, e.g., an indication of devices changing technology within the geographic area, interference issues, capacity issues, etc. In some instances, based on identification of such an adverse effect on one or more of the antenna cells, the coverage hole mitigation module 228 can send a signal to change the power of the first antenna cell from the second power level to the first power level (i.e., revert back to the initial power level). In such instances, it can be desirable to revert back expediently to mitigate the adverse effect. In some embodiments, for example, a time period to change the power of the first antenna cell from the second power level to the first power level (e.g., based on identification of an adverse effect on one or more antenna cells) is less than a time period to further increase the power of the first antenna cell from the second power level to the third power level (e.g., based on the improvement of one or more antenna cells).

In some instances, the first antenna cell can meet a capacity limit after its power is increased (e.g., from the first power level to the second power level). In such instances, the coverage hole mitigation module 228 can send a signal to change the power of the first antenna cell from the second power level to the first power level, or to a power level there between suitable to address any capacity limit issues.

In some instances, the antenna can meet a capacity limit during or after its tilt increase (e.g., from the first tilt position to the second tilt position). In such instances, the coverage hole mitigation module 228 can send a signal to change the tilt of the antenna from the second tilt position to the first tilt position, or to a tilt position there between suitable to address any capacity limit issues.

Modifications to the power level and/or the tilt of an antenna selected to mitigate a coverage hole can incremental, and can be triggered in any suitable order. Such incremental modifications can allow for better monitoring, control and reaction to effects on network performance.

Figure 5:
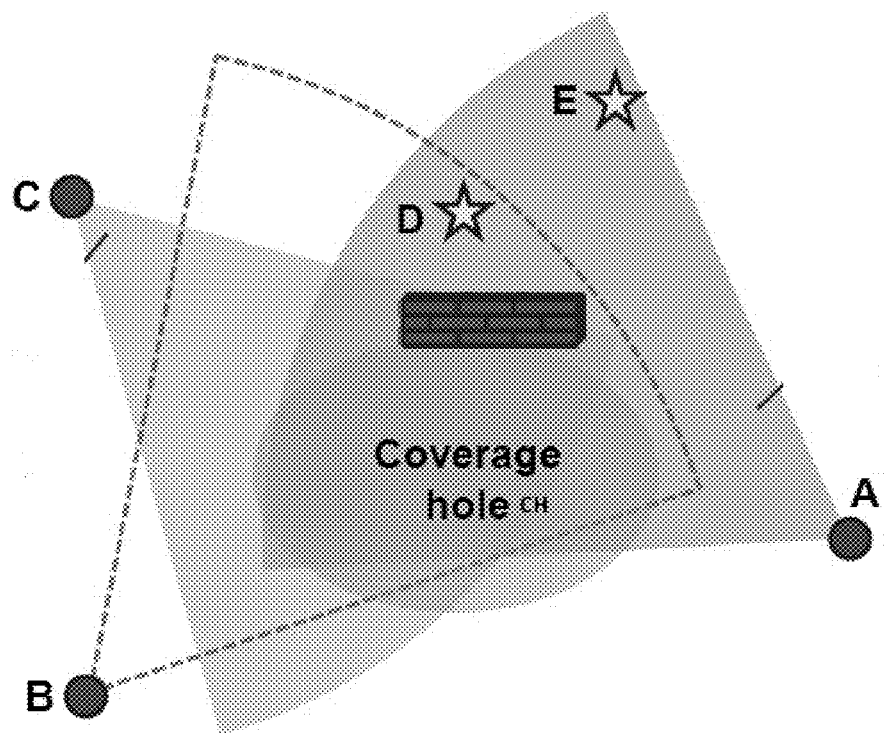
FIG. 5 illustrates in a wireless network implementing interference management and optimization to mitigate a detected coverage hole, according to an embodiment.
Figure 6:
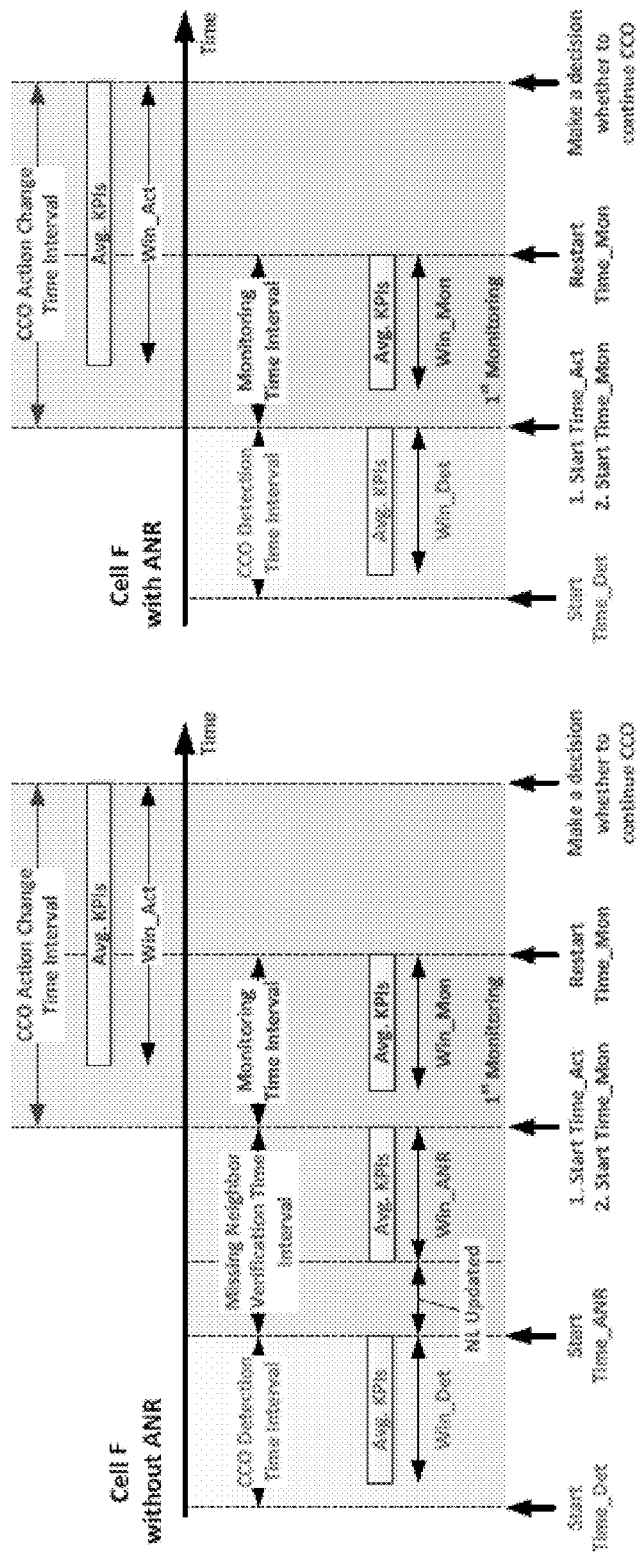
FIGS. 6(a) and 6(b) illustrate a process for using timers when implementing coverage and capacity optimization for cells without automatic neighbor relation (ANR) updating, and cells with ANR updating, respectively, according to an embodiment.

Before, after, or while modifying a power level and/or tilt of an antenna cell to modify a coverage hole within a wireless network, potential interference to the antenna cell's neighbors can be monitored, reduced and/or minimized. (also referred to herein as potential victims). FIG. 5 illustrates a use case example of such interference management and improvement within a wireless network having a detected coverage hole CH, according to an embodiment. As shown, the wireless network includes three candidate antenna cells (i.e., antenna cell A; antenna cell B; antenna cell C) with established cell coverage areas surrounding the coverage hole CH, and two potential victim antenna cells (i.e., antenna cell D; antenna cell E).

Potential victim antenna cells can be identified and/or selected for interference management based on, for example, a value associated with handovers, an azimuth angle, a beamwidth, and/or a distance estimated by an estimate of propagation time and/or geographic information, such as, latitude and longitude data.

As shown by the coverage areas established from each candidate antenna cell, the three candidate antenna cells A, B, and C, are available to mitigate the coverage hole CH (e.g., by adjustment in antenna power level and/or tilt). Notwithstanding neighbor interference issues (i.e., disregarding potential victim antenna cells D, E), in some embodiments, a candidate antenna cell from the three candidate antenna cells can be selected to mitigate the coverage hole CH based on a predefined ranking, for example, a cost-based ranking (e.g., a cost value to modify a configuration of a given antenna cell). A cost value can be based on, for example, a value associated with dropped calls, a value associated with handovers, a value associated with other user devices likely to be affected by a mitigation action, distances from tilt or power limits, and/or proximity to the coverage hole. Further, antenna cells, and/or in some instances potential victim antenna cells, can be selected for mitigation action based on, for example, an azimuth angle, a beamwidth, and/or a distance estimated by an estimate of propagation time and/or geographic information, such as, latitude and longitude data.

As a further example, capacity of the antenna cells can serve as an additional or alternative factor for determining ranking. For example, if candidate antenna cell A can handle a first number of subscriber devices, and candidate antenna cell B can handle a second number of subscriber devices larger than the first number of subscriber devices, candidate antenna cell B may be more suitable than candidate antenna cell A for mitigating certain coverage holes requiring a certain capacity.

As yet an additional or alternative factor for ranking purposes, a candidate antenna cell can be selected to use to at least partially mitigate the coverage hole CH based on a portion of the coverage hole CH associated with that antenna cell being greater than a portion of the coverage hole associated with each remaining candidate antenna cells. As an example, if candidate antenna cell A can be reconfigured to mitigate 50% of coverage hole CH, and candidate antenna cell B can be reconfigured to mitigate only 20% of coverage hole CH, candidate antenna cell A will be ranked higher than candidate antenna cell B. Further to this example, in some instances, based on a cost value associated with modifying a configuration of antenna cell A being significantly higher than a cost value associated with modifying a configuration of antenna cell B, candidate antenna cell B may have a ranking higher than candidate antenna cell A, in some instances, even when the candidate antenna cell A can be reconfigured to mitigate a larger portion of the coverage hole CH than the candidate antenna cell B. Assuming for discussion purposes that candidate antenna cell A is ranked higher than candidate antenna cell B, and the candidate antenna cell B is ranked higher than the candidate antenna cell C, when the coverage hole CH is detected, candidate antenna cell A is initially selected based on its ranking to mitigate the coverage hole CH.

Candidate antenna cell A and candidate antenna cell B can share a common potential victim antenna cell (i.e., potential victim antenna cell D) within their established cells. Similarly stated, if both candidate antenna cell A and candidate antenna cell B were to collectively or substantially simultaneously adjust their power levels or tilt settings to mitigate the coverage hole CH, potential victim antenna cell D may experience interference issues due to being within the coverage areas established by candidate antenna cell A and candidate antenna cell B. To minimize or avoid such interference issues, in this example, the configurations of candidate antenna cell A and candidate antenna cell B are not collectively or substantially simultaneously modified to mitigate the coverage hole CH.

Turning to the next best antenna cell to help mitigate the coverage hole CH, i.e., candidate antenna cell C, as shown in FIG. 5, does not share a common potential victim antenna with candidate antenna cell A. Similarly stated, potential victim antenna cell D is within the coverage area of candidate antenna cell A, but not within the coverage area of candidate antenna cell C. In this manner, candidate antenna cell A and candidate antenna cell C can be collectively or substantially simultaneously reconfigured to mitigate the coverage hole CH, while minimizing or limiting interference with neighbor antenna cells (e.g., potential victim antenna cell D).

Referring back to FIGS. 1 and 2, in some instances, the network optimization device 101 and/or 201 can conduct such an interference management or mitigation process. In such embodiments, the coverage hole mitigation module (e.g., coverage hole mitigation module 228) can, for each antenna cell from multiple antenna cells, detect one or more potential victim antenna cells within an area covered by that antenna cell if that antenna cell were used to mitigate a coverage hole. The coverage hole mitigation module 228 can then select a first antenna cell from the multiple antenna cells to use to mitigate the coverage hole, and send a signal to modify a configuration associated with the first antenna cell to at least partially mitigate the coverage hole.

As discussed with respect to FIG. 5, due to potential interference, in some instances, the coverage hole mitigation module 228 will not use a second antenna cell from the multiple antenna cells to mitigate the coverage hole based on an antenna cell from the one or more detected potential victim antenna cells within the area covered by the second antenna cell being within the one or more potential victim antenna cells within the area covered by the first antenna cell. The coverage hole mitigation module 228, instead, can send a signal to modify a configuration associated with a third antenna cell from the multiple antenna cells based on each antenna cell from the one or more detected potential victim antenna cells within the area covered by the third antenna cell not being within the one or more potential victim antenna cells within the area covered by the first antenna cell.

Capacity and coverage optimization (CCO) of the wireless network can be an iterative process based on many factors, and can include detecting, managing, reconfiguring and monitoring many network elements and components, as discussed above. As such, in some embodiments, various timers can be employed to detect, manage and/or monitor performance changes in the wireless network. FIGS. 6a and 6b illustrate a process for using timers when implementing CCO for cells without automatic neighbor relation (ANR) updating (FIG. 6a), and cells with ANR (FIG. 6b) updating, respectively. ANR is a function used by some cellular network technologies (e.g., LTE) to relieve an operator from managing neighbor relations.

For ease of illustration, the timers can be divided into two categories, i.e., identification timers and mitigation timers. The detection timer (Time_Det) and the neighbor relation timer (Time_ANR) are classified as identification timers, and can specify time periods in which to detect network performance problems and identify when such problems should be classified as coverage holes. The action timer (Time-Act) and monitor timer (Time-Mon) are classified as mitigation timers.

As shown in FIG. 6a, first, the detection timer (Time_Det) is started for the network. During this detection period defined by the detection timer (see "CCO Detection Time Interval"), network performance problems are detected and identified within the network including cell F based on examining the KPI's (or an average of the KPI's) associated with cell F and the detection period. If no network performance problems are identified upon expiration of the detection timer, the detection timer is reset, thereby resulting in a new set of KPI's to be analyzed and used to identify network performance problems within the network.

Upon identification of a network performance problem, the antenna cell(s) associated with the network performance problem (e.g., antenna cell F) proceeds from following the detection timer (e.g., the detection timer can be associated with all antenna cells in the network) to following the neighbor relation timer specific to cell F, which is triggered upon expiration of the detection timer and based on the identification of the network performance problem. In other words, antenna cell F (also referred to herein as a problem cell) can transfer from the global timer detection process to a cell specific identification/mitigation process.

Because antenna cell F does not use an ANR function, as illustrated in FIG. 6a, a neighbor relation timer (Time_ANR) is activated after the time period ("CCO Detection Time Interval") defined by the detection timer, to determine if an outdated or inaccurate neighbor relation list is causing and/or contributing to the detected network performance problem. As shown in FIG. 6a, the neighbor list can be updated (shown as "NL Updated") during the time period (or "Missing Neighbor Verification Time Interval") defined by the neighbor relation timer.

In addition, as discussed in further detail herein, a down cell detection process can be executed to determine any inactive cells associated with the geographic area of the network performance problem. This process can include, for example, accessing a list of current inactive cells, and/or querying one or more antenna cells, or associated components, to identify any inactive cells.

Upon expiration of the neighbor relation timer and after updating the neighbor list, the KPI's associated with that timer (i.e., the "Missing Neighbor Verification Time Interval") are analyzed to determine if the network performance problem still exists. In some embodiments, the KPI's associated with the neighbor relation timer can be compared with the KPI's associated with the detection timer. If the network performance problem still exists after the down cell detection process results in no inactive cells identified, and neighbor list is updated, the network performance problem can be classified as a coverage hole.

In response to identifying the network performance problem as a coverage hole upon expiration of the neighbor relation timer (FIG. 6*a*), the action timer and the monitor timer are activated (shown in FIGS. 6*a* and 6*b* as the beginning of the "CCO Action Change Time Interval").

In other embodiments, as shown in FIG. 6*b*, the antenna cell F can already employ ANR (e.g., LTE). In such embodiments, an updated and/or accurate neighbor list can be accessed without sending a neighbor relation request to update a neighbor list, thus rendering, in some instances, the neighbor relation timer unnecessary. As such, the action timer and the monitor timer can be activated upon expiration of the detection timer and based on the identification of a coverage hole within the cell (e.g., cell F).

At this time, a signal is sent to modify (1) a power associated with one or more antenna cells that are associated with the problem cell (e.g., antenna cell F), and/or (2) a tilt of an antenna of one or more antenna cells that are associated with the problem cell (e.g., antenna cell F). In other words, suitable antenna cells are modified (also referred to herein as a "CCO Action Change") to mitigate the coverage hole in the problem cell.

During a duration associated with the action timer (the "CCO Action Change Time Interval") and a duration associated with the monitor timer (the "Monitoring Time Interval"), the KPI's (or average of the KPI's) associated with one or both of those durations are analyzed to determine network performance and/or a change thereto. For example, a set of KPIs can be monitored during each monitor period (defined by the monitoring time interval(s)). Upon expiration of each monitor timer, the KPI's collected and/or monitored during that time period can be analyzed for status of and/or changes to status of network performance. Further, upon expiration up each action timer, based on the assessment of the data (e.g., KPI's) monitored during the associated monitoring time interval, progressive action/mitigation can occur. When an action (e.g., power or tilt) is executed, monitoring according to the appropriate monitor timer (and associated interval) will occur to assess the results of the action(s) on network performance. Similarly stated, correlative results between the action change (power or tilt) and the network performance, based on KPI's, can be monitored, defined, analyzed, acted upon, and re-acted upon.

In some embodiments, a duration associated with the monitor timer can be less than a duration associated with the action timer. This is illustrated in FIGS. 6*a* and 6*b* by the "Monitoring Time Interval" disposed between the "Start Time_Act" and the "Restart Time_Mon." In this manner, upon expiration of the monitor timer, but before expiration of the action timer, the CCO action change can be modified or reverted back to initial or prior settings. For example, based on determining a decrease in performance associated with the one or more antenna cells a signal can be sent to revert the power associated with the one or more antenna cells or the tilt of the antenna of the one or more antenna cells to a prior configuration.

In this manner, effects on network performance by CCO action changes can be monitored periodically or in substantially real-time such that any undesirable effects can be sensibly and relatively quickly mitigated. For example, consider the case where a CCO action change includes three power steps/modifications, then two tilt position changes, and then one more power modification. A monitor timer can be employed and reset multiple times (e.g., 6 times) before the above action changes are implemented. As such, a decrease in performance associated with the antenna receiving the CCO action change can be identified relatively quickly and appropriate action (e.g., revert to a prior configuration) can be taken. Accordingly, adverse effects can be identified and mitigated within a shorter time period than taking additional progressive action to mitigate a coverage hole.

Figure 7:
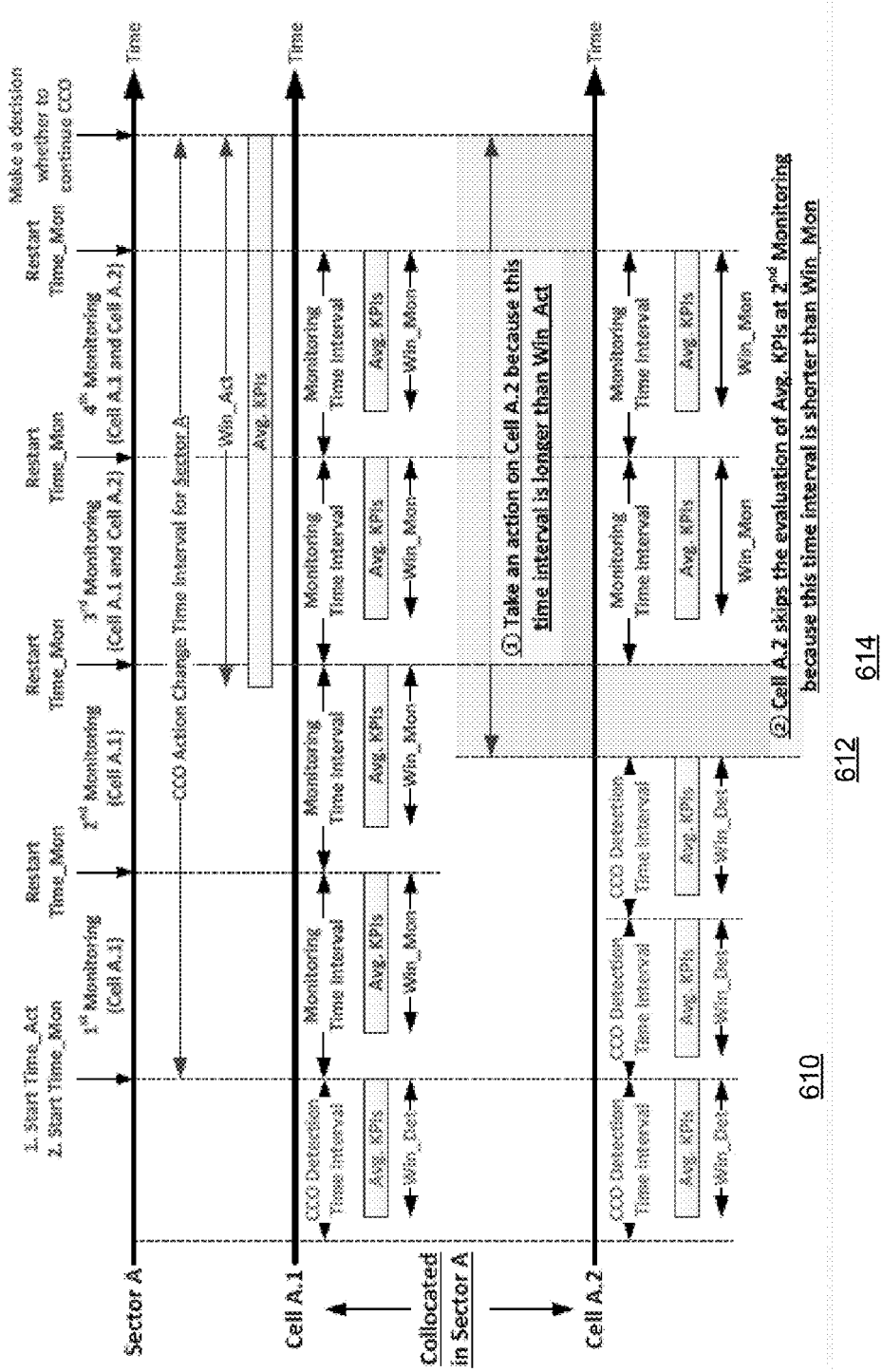
FIG. 7 illustrates a process for synchronizing timers associated with multiple antenna cells of a single antenna, according to an embodiment.

In some embodiments, CCO can be applied to antenna cells at a single antenna or antenna sector. FIG. 7 illustrates a process for using timers when implementing CCO for antenna cells similar to the process described with respect to FIG. 6*b*, and more particularly, synchronizing timers associated with multiple antenna cells at a single antenna, according to an embodiment. As shown in FIG. 7, cell A.1 and cell A.2 are collocated in Sector A (e.g., are associated with a common antenna), and each have associated therewith, similar to the discussion above with respect to FIG. 6, an action timer and a monitor timer.

As an example, in use, a network performance problem can be detected in cell A.1 during the CCO Detection Time Interval. In this example, similar to FIG. 6*b*, the antenna of the cells A.1 and A2. has ANR, and as such, a neighbor relation timer is unnecessary. Upon expiration of the A.1 detection timer at 610, and an indication of no inactive cells within the associated geographic area, the A.1 action timer and A.1 monitor timer can be triggered, to coincide with instructions to modify a power or tilt associated with cell A.1.

As shown in FIG. 7, at the expiration of the A.1 detection timer at 610, and the start of the A.1 action timer and the A.1 monitor timer, the A.2 detection timer resets (i.e., a new CCO detection time interval for cell A.2 begins, and a new set of KPI's are averaged and analyzed). At this moment, the intervals associated with the A.1 timers are not in sync with the intervals associated with the A.2 timers. Further, at 612, it can be determined (e.g., based on associated KPI's) that cell A.2 should be reconfigured to mitigate a coverage hole, and as such, instructions can be sent, upon expiration of the action timer, to modify a power or tilt associated with cell A.2. As shown at 614, the A.1 monitor timer and the A.2 monitor timer are synchronized (i.e., the $3^{rd}$ and $4^{th}$ monitoring intervals monitor KPI's associated with both cell A.1 and cell A.2). After a power change associated with one or more cells, KPI's uniquely associated with each of those cells can be monitored individually. For example, after a power change associated with either antenna cell A.1 or antenna cell A.2, network performance associated with antenna cell A.1 will be analyzed and compared against a performance threshold, and network performance associated with antenna cell A.2 will be analyzed and compared against a performance threshold. Further, in some instances, after a tilt change associated with one or more cells, KPI's will be analyzed after being aggregated for the entire sector (i.e., for all antenna cells at an antenna). For example, in such instances, after a tilt change associated with an antenna propagating antenna cell A.1 and antenna cell A.2, monitoring will take place at the sector level (i.e., an aggregated performance average for the entire sector (e.g., sector A)). Further, when appropriate according to the aggregated KPI data, and upon expiration of the associated action timer, progressive action (e.g., tilt) can be taken for all antenna cells of an antenna.

Figure 8:
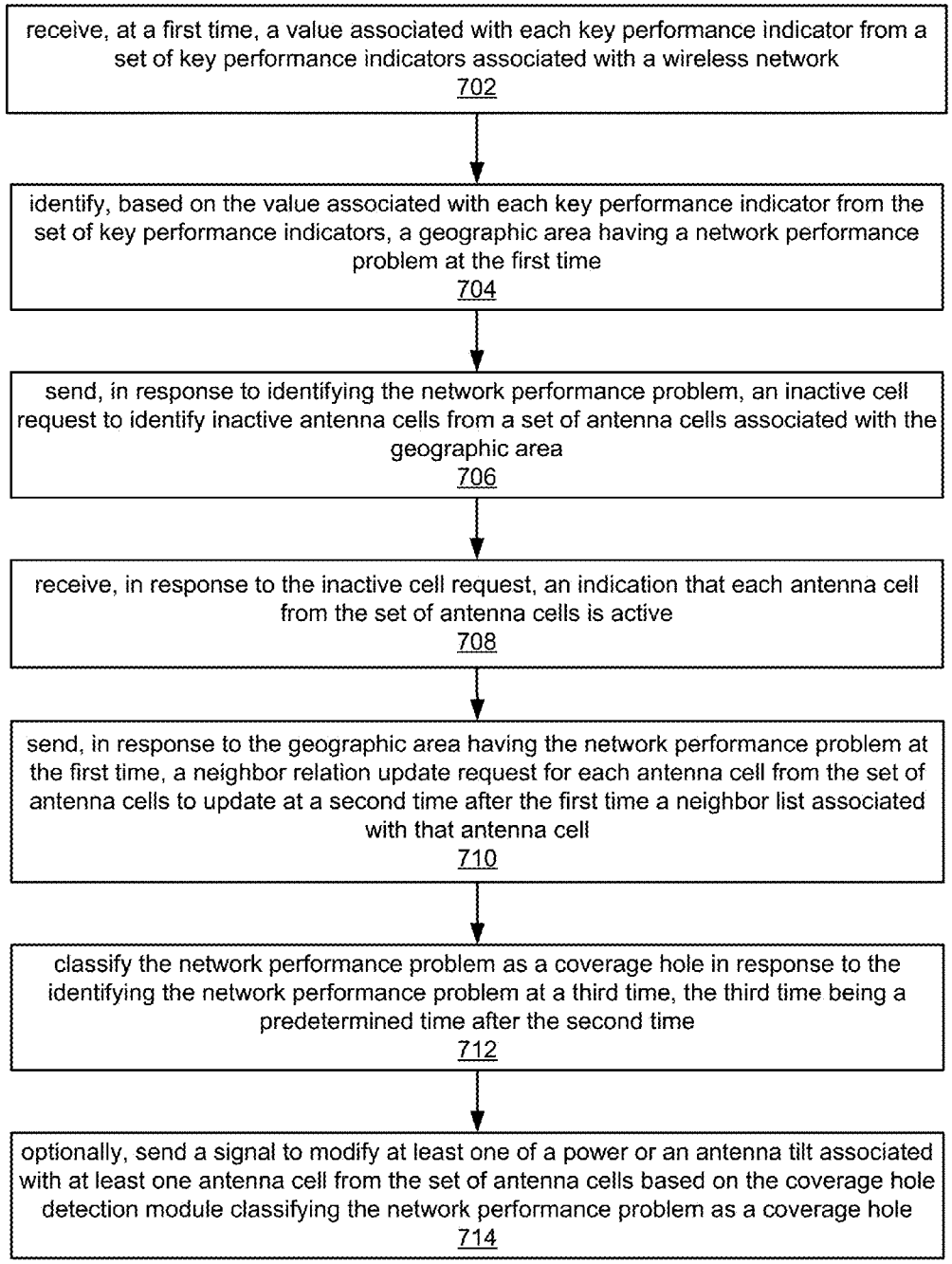
FIG. 8 is a flow chart illustrating a method for improving coverage and capacity within a wireless network, according to an embodiment.

FIG. 8 is a flow chart illustrating a method 700 for optimizing coverage and capacity in a wireless network, according to an embodiment. The code representing instructions to perform method 700 can be stored in, for example, a non-transitory processor-readable medium (e.g., a memory) in a network optimization device that is similar to the network optimization device 101 and 201 shown and described with respect to FIGS. 1 and 2. Particularly, the network optimization device can be included in a wireless network similar to the wireless network 100 shown and described with respect to FIG. 1. The wireless network can be associated with a cellular network area. In some instances, the wireless network is used to provide wireless communication coverage for the cellular network area. The code stored in the non-transitory processor-readable medium of the network optimization device can be executed by a processor of the network optimization device that is similar to the processor 220 in FIG. 2. The code includes code to be executed by the processor to cause the network optimization device to operate the functions illustrated in FIG. 8 and described as follows.

At 702, the network optimization device can receive, at a first time, a value associated with each key performance indicator from a set of key performance indicators associated with a wireless network. The set of key performance indicators can include, for example, a drop call rate, an indication of received signal power at a set of user devices, an estimate of propagation time between the set of user devices and an access point (e.g., a base station similar to base station 146 in FIG. 1, and/or an antenna similar to antenna 152 in FIG. 1) associated with an antenna cell from the set of antenna cells, available resources at the set of user devices, a radio resource utilization rate at the access point, or an indication of devices changing technology within the geographic area. At 704, the network optimization device can identify, based on the value associated with each key performance indicator from the set of key performance indicators, a geographic area having a network performance problem at the first time.

At 706, the network optimization device can send, in response to identifying the network performance problem, an inactive cell request to identify inactive antenna cells from a set of antenna cells associated with the geographic area. The inactive cell request, for example, can be sent to a down cell detection module. At 708, the network optimization device can receive, in response to the inactive cell request, an indication that each antenna cell from the set of antenna cells is active. As such, the network performance problem can be identified as not an inactive cell problem.

At 710, the network optimization device can send, in response to the geographic area having the network performance problem at the first time a neighbor relation update request for each antenna cell from the set of antenna cells to update at a second time after the first time a neighbor list associated with that antenna cell. In some instances, the network optimization device can send the neighbor relation request in response to receiving the indication that each antenna cell from the set of antenna cells is active. If the network performance problem is identified after a predetermined time at the second time, the network performance problem can be identified as not a handoff/neighbor relation problem.

At 712, the network optimization device can classify the network performance problem as a coverage hole in response to the identifying the network performance problem at a third time. The third time is a predetermined time after the second time. Similarly stated, based on the results from the inactive cell request and the neighbor relation update request, and identifying the network performance at the third time (i.e., after the inactive cell and inaccurate neighbor lists are identified as not the problem), the network performance problem can be classified as a coverage hole.

In some embodiments, method 700 can include step 714 in which the network optimization device can send a signal to modify at least one of a power or an antenna tilt associated with at least one antenna cell from the set of antenna cells based on the classifying the network performance problem as a coverage hole. In some instances, the network optimization device can, for each antenna cell from the set of antenna cells, detect a set of potential victim antenna cells within an area covered by that antenna cell from the set of antenna cells if that antenna cell from the set of antenna cells were used to mitigate the coverage hole. The network optimization device can select a first antenna cell from the set of antenna cells to use to mitigate the coverage hole, and send a signal to modify a configuration associated with the first antenna cell to at least partially mitigate the coverage hole. In some instances, the network optimization device does not use a second antenna cell from the set of antenna cells to mitigate the coverage hole based on an antenna cell from the set of potential victim antenna cells within the area covered by the second antenna cell being within the set of potential victim antenna cells within the area covered by the first antenna cell.

In some instances, the network optimization device can, for each antenna cell from the set of antenna cells, detect a set of potential victim antenna cells within an area covered by that antenna cell from the set of antenna cells if that antenna cell from the set of antenna cells were used to mitigate the coverage hole. The network optimization device can select a first antenna cell from the set of antenna cells to use to mitigate the coverage hole, and can send a signal to modify a configuration associated with the first antenna cell to at least partially mitigate the coverage hole. The network optimization device can be configured to send a signal to modify a configuration associated with a second antenna cell from the set of antenna cells based on each antenna cell from the set of potential victim antenna cells within the area covered by the second antenna cell not being within the set of potential victim antenna cells within the area covered by the first antenna cell.

In some instances, the network optimization device can rank the set of antenna cells based on a cost value to modify a configuration of each antenna cell from the set of antenna cells, and at a fourth time after the third time, send a signal to change a configuration associated with a first antenna cell from the set of antenna cells to mitigate the coverage hole based on the first antenna cell having a rank meeting a first predetermined criterion. The network optimization device can, at a fifth time after the fourth time, send a signal to change a configuration associated with a second antenna cell from the set of antenna cells to mitigate the coverage hole based on (1) the second antenna cell from the set of antenna cells having a rank meeting a second predetermined criterion (e.g., has the next lowest cost) and (2) the first antenna cell from the set of antenna cells not meeting a third predetermined criterion (e.g., would cause interference).

In some instances, the network optimization device can select an antenna cell from the set of antenna cells to use to at least partially mitigate the coverage hole based on a portion of the coverage hole associated with the antenna cell from the set of antenna cells being greater than a portion of the coverage hole associated with each remaining antenna cell from the set of antenna cells.

Figure 9:
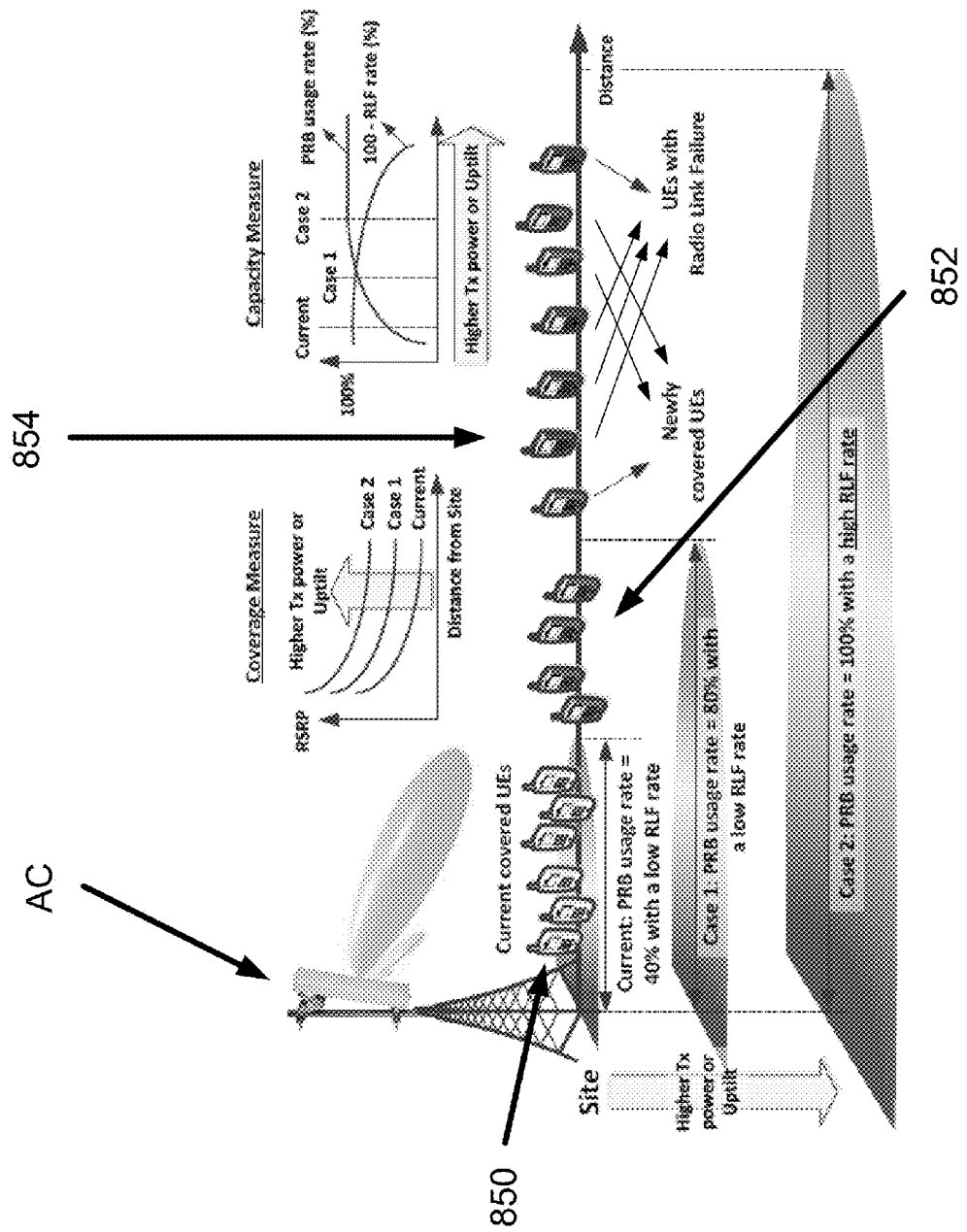
FIG. 9 illustrates an antenna coverage map and associated coverage and capacity plots in three different configurations for a wireless network, according to an embodiment

When optimizing the capacity and coverage of a wireless network, a tradeoff can exist between such coverage and capacity. For example, in some cases, an expansion in coverage may lead to a decrease in capacity. FIG. 9 illustrates an antenna coverage map and associated coverage and capacity plots for a wireless network, in three different configurations, according to an embodiment. At 850 (or current case), six subscriber devices (or user devices UEs) are covered by or in potential communication with the antenna cell AC. At 852 (or case 1), with increased power and/or tilt, coverage is increased, as illustrated by increased coverage area, and an additional four UEs are within the coverage area. At 854 (or case 2), power and/or tilt are further increased, resulting in increased coverage for the antenna cell AC. As shown at 854, there are newly covered UEs and because of the increased number of UEs and/or the distance of such UEs from the antenna cell AC, many UEs may experience radio link failure (RLF). Thus, as coverage is expanded, radio link failure events can result due to the lack of available resources at the antenna cell AC. As such, when employing a CCO action and monitoring process, in some instances, the optimization can terminate, alter, or revert back configuration changes (e.g., power or tilt change) when a particular cell is overcrowded (e.g., case 2 in FIG. 9).

As shown by the "Coverage Measure plot of FIG. 9, as CCO action (e.g., power increase or uptilt modifications) is taken, coverage increases for a given distance from the antenna. As coverage increases, however, capacity complications can arise. Thus, in some instances, an optimized point of coverage and capacity can be identified. For example, as shown by the "Capacity Measure" plot of FIG. 9, as CCO action is taken, an optimization point can exist at about case 1 (e.g., a relatively high use rate and a relatively low radio link failure rate). After such a point, any further CCO action (e.g., to increase coverage) can result in a negligible increase, if any, in use rate, and a significant increase in RLF rate.

While shown in FIG. 2 as being included in the processor 220 of the network optimization device 201, in other embodiments, a coverage hole detection module, down cell detection module, neighbor relation module, and/or coverage hole mitigation module can communicate with any other device of the wireless network via an application programming interface (API) of a network module and/or application, a network process, an intermediary device, and/or any other suitable means. Additionally, a network optimization device (e.g., the network optimization device 101 in FIG. 1) can receive network information and/or data (e.g., key performance indicators) from a network database (e.g., the network database 120 in FIG. 1) or any other device in any suitable format such as, for example, text files, a file format associated with a network, and/or the like. Similarly, the network optimization device can send instructions of configuration and monitoring changes to network elements in any suitable means.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a coverage hole detection module implemented in at least one of a memory or a processing device, the coverage hole detection module configured to receive, at a first time, a value associated with each key performance indicator from a set of key performance indicators associated with a wireless network,
the coverage hole detection module configured to identify, based on the value associated with each key performance indicator from the set of key performance indicators, a geographic area having a network performance problem at the first time,
the coverage hole detection module configured to send, in response to identifying the network performance problem and to a down cell detection module, an inactive cell request to identify inactive antenna cells from a set of antenna cells associated with the geographic area,
the coverage hole detection module configured to receive, from the down cell detection module and in response to the inactive cell request, an indication that each antenna cell from the set of antenna cells is active,
the coverage hole detection module configured to send, in response to the geographic area having the network performance problem at the first time and to a neighbor relation module, a neighbor relation update request for each antenna cell from the set of antenna cells to update at a second time after the first time a neighbor list associated with that antenna cell, the coverage hole detection module configured to classify the network performance problem as a coverage hole in response to the coverage hole detection module identifying the network performance problem at a third time, the third time being a predetermined time after the second time, and a coverage hole mitigation module operatively coupled to the coverage hole detection module, the coverage hole mitigation module configured to send a signal to modify at least one of a power or an antenna tilt associated with at least one antenna cell from the set of antenna cells based on the coverage hole detection module classifying the network performance problem as a coverage hole.

2. The apparatus of claim 1, wherein the set of key performance indicators includes a drop call rate, an indication of received signal power at a set of user devices, an estimate of propagation time between the set of user devices and an access point associated with an antenna cell from the set of antenna cells, available resources at the access point, available resources at the set of user devices, a radio resource utilization rate at the access point, and an indication of devices changing technology within the geographic area.

3. The apparatus of claim 1, wherein the coverage hole detection module is configured to send the neighbor relation update request in response to receiving the indication that each antenna cell from the set of antenna cells is active.

4. The apparatus of claim 1, wherein the at least one antenna cell from the set of antenna cells is a first antenna cell, the coverage hole mitigation module is configured to, for each antenna cell from the set of antenna cells, detect a set of potential victim antenna cells within an area covered by that antenna cell from the set of antenna cells if that antenna cell from the set of antenna cells were used to mitigate the coverage hole, the coverage hole mitigation module configured to select the first antenna cell from the set of antenna cells to use to mitigate the coverage hole, the coverage hole mitigation module configured to not use a second antenna cell from the set of antenna cells to mitigate the coverage hole based on an antenna cell from the set of potential victim antenna cells within the area covered by the second antenna cell being within the set of potential victim antenna cells within the area covered by the first antenna cell.

5. The apparatus of claim 1, wherein the at least one antenna cell from the set of antenna cells is a first antenna cell, the coverage hole mitigation module configured to, for each antenna cell from the set of antenna cells, detect a set of potential victim antenna cells within an area covered by that antenna cell from the set of antenna cells if that antenna cell from the set of antenna cells were used to mitigate the coverage hole, the coverage hole mitigation module configured to select the first antenna cell from the set of antenna cells to use to mitigate the coverage hole, the coverage hole mitigation module configured to send a signal to modify a configuration associated with a second antenna cell from the set of antenna cells based on each antenna cell from the set of potential victim antenna cells within the area covered by the second antenna cell not being within the set of potential victim antenna cells within the area covered by the first antenna cell.

6. The apparatus of claim 1, wherein:

the coverage hole mitigation module is configured to rank the set of antenna cells based on a cost value to modify a configuration of each antenna cell from the set of antenna cells, the coverage hole mitigation module is configured to, at a fourth time after the third time, send a signal to change a configuration associated with a first antenna cell from the set of antenna cells to mitigate the coverage hole based on the first antenna cell having a rank meeting a first predetermined criterion, and the coverage hole mitigation module is configured to, at a fifth time after the fourth time, send a signal to change a configuration associated with a second antenna cell from the set of antenna cells to mitigate the coverage hole based on (1) the second antenna cell from the set of antenna cells having a rank meeting a second predetermined criterion and (2) the first antenna cell from the set of antenna cells not meeting a third predetermined criterion.

7. The apparatus of claim 1, wherein the coverage hole mitigation module is configured to select the at least one antenna cell from the set of antenna cells to use to at least partially mitigate the coverage hole based on a portion of the coverage hole associated with the at least one antenna cell from the set of antenna cells being greater than a portion of the coverage hole associated with each remaining antenna cell from the set of antenna cells.

8. An apparatus, comprising:

a coverage hole mitigation module implemented in at least one of a memory or a processing device, the coverage hole mitigation module configured to receive an indication of a coverage hole within a geographic area and associated with a plurality of antenna cells associated with an antenna, the coverage hole mitigation module configured to identify a first antenna cell (1) from the plurality of antenna cells and (2) to use to mitigate the coverage hole, the coverage hole mitigation module configured to send a signal to change a tilt of the antenna from a first position to a second position at a first time, the coverage hole mitigation module configured to send, at a second time after the first time, a signal to increase power of the first antenna cell from a first power level to a second power level in response to at least one of (1) an adverse effect on a coverage area associated with a second antenna cell from the plurality of antenna cells and during a predetermined time period after the first time, or (2) a limit associated with the tilt of the antenna, a time period to change the power of the first antenna cell from the second power level to the first power level after the second time based on an adverse effect on at least one antenna cell from the plurality of antenna cells is less than a time period to further increase the power of the first antenna cell from the second power level to a third power level after the second time based on an improvement in a value of at least one key performance indicator from a plurality of key performance indicators.

9. The apparatus of claim 8, wherein the coverage hole mitigation module is configured to, at a third time after the second time, send a signal to change the power of the first antenna cell from the second power level to the first power level if a value of at least one key performance indicator from the plurality of key performance indicators indicates from the second time to the third time a decrease in performance of at least one antenna cell from the plurality of antenna cells, the coverage hole mitigation module configured to not send, at the third time, a signal to increase the power of the first antenna cell from the second power level to the third power level if a value of at least one key performance indicator from the plurality of key performance indicators indicates from the second time to the third time no decrease in performance of each antenna cell from the plurality of antenna cells.

10. The apparatus of claim 8, further comprising:
a coverage hole detection module operatively coupled to the coverage hole mitigation module, the coverage hole detection module configured to detect a network performance problem within the geographic area and identify the network performance problem as the coverage hole based on the network performance problem not being associated with an inactive antenna cell or an outdated neighbor list.

11. The apparatus of claim 8, wherein coverage hole mitigation module is configured to identify the adverse effect on the coverage area associated with the second antenna cell based on a value for each key performance indicator from the plurality of key performance indicators,
the plurality of key performance indicators includes at least one of a drop call rate, an indication of received signal power at a set of user devices, an estimate of propagation time between the set of user devices and an access point associated with the second antenna cell, available resources at the set of user devices, a radio resource utilization rate at the access point, and an indication of devices changing technology within the geographic area.

12. The apparatus of claim 8, wherein the coverage hole mitigation module configured to send a signal to change the tilt from the second position to the first position at a third time after the first time but before the second time and in response to a value for at least one key performance indicator from the plurality of key performance indicators indicating the adverse effect on the coverage area associated with the second antenna cell from the plurality of antenna cells and during a predetermined time period between the first time and the third time.

13. The apparatus of claim 8, wherein the coverage hole mitigation module is configured to send, at a third time after the first time, a signal to change the tilt of the antenna from the second position to a third position based on a limit associated with the power of the first antenna cell.

14. The apparatus of claim 8, wherein the coverage hole mitigation module is configured to, at a third time after the second time, send a signal to change the power of the first antenna cell from the second power level to the first power level if a value associated with a capacity of the first antenna cell meets a capacity limit criterion after the second time and before the third time.

15. A method, comprising:
analyzing, periodically and upon expiration of a detection timer for a wireless network, a first value of each key performance indicator from a set of key performance indicators for the wireless network;
identifying, based on the first value associated with at least one key performance indicator from the set of key performance indicators, a geographic area having a network performance problem at a time;
sending, in response to the geographic area having the network performance problem at the time, a neighbor relation request to update a neighbor list associated with at least one antenna cell from a set of antenna cells associated with the geographic area;
initiating a neighbor relation timer associated with the at least one antenna cell based on the sending the neighbor relation request;
upon expiration of the neighbor relation timer, identifying the network performance problem as a coverage hole if a second value associated with the at least one key performance indicator does not meet a first predetermined criterion;
sending, in response to the identifying the network performance problem as the coverage hole, a signal to modify at least one of a power associated with the at least one antenna cell from the set of antenna cells or a tilt of an antenna including the at least one antenna cell from the set of antenna cells;
initiating a monitor timer and an action timer for the antenna in relation to the signal to modify at least one of the power or the antenna tilt, a duration associated with the monitor timer being less than a duration associated with the action timer;
upon expiration of the monitor timer, receiving a third value of each key performance indicator from the set of key performance indicators and determining improvement or decrease in performance associated with the antenna based on the third value of the at least one key performance indicator from the set of key performance indicators; and
upon expiration of the action timer, sending a signal to further modify at least one of the power associated with the at least one antenna cell from the set of antenna cells or the tilt of the antenna if a fourth value of the at least one key performance indicator from the set of key performance indicators meets a second predetermined criterion.

16. The method of claim 15, wherein the set of key performance indicators includes a drop call rate, an indication of received signal power at a set of user devices, an estimate of propagation time between the set of user devices and an access point associated with an antenna cell from the plurality of antenna cells, available resources at the access point, a radio resource utilization rate, and an indication of devices changing technology within the geographic area.

17. The method of claim 15, further comprising:
upon expiration of the monitor timer, before expiration of the action timer, and based on determining a decrease in performance associated with the antenna, sending a signal to revert the at least one of the power associated with the at least one antenna cell from the set of antenna cells or the tilt of the antenna to a prior configuration.

18. The method of claim 15, wherein the second predetermined criterion is at least one of a decrease in a drop call rate, a decrease in received signal power at a set of user devices, an increase in propagation time between the set of user devices and an access point associated with the antenna, a decrease in available resources at the access point, or a decrease in a rate of devices changing technology within the geographic area.

19. The method of claim 15, wherein the initiating the monitor timer and the action timer for the antenna is based on an initial coverage hole detection associated with the antenna.

20. The method of claim 15, wherein the the third value is from a set of third values, each third value from the set of third values being associated with a unique antenna cell of the antenna,
the determining improvement or decrease in performance associated with the antenna is based on: (1) the third value from the set of third values for each antenna cell of the antenna meeting a third predetermined criterion if the power of the at least one antenna cell is modified, or (2) a combination of each third value from the set of third values meeting a fourth predetermined criterion if the antenna tilt associated with the at least one antenna cell is modified.

21. The method of claim 15, wherein the geographic area is a first geographic area, the time is a first time, and the at least one antenna cell is a first antenna cell included in the antenna, the method further comprising:
   identifying a second geographic area having a network performance problem at a second time after the first time and prior to expiration of the action timer, the second geographic area being associated with a second antenna cell included in the antenna; and
   waiting until expiration of the action timer to modify at least one of a power of the second antenna cell included in the antenna or the tilt of the antenna based on the second geographic area having the network performance problem.

\* \* \* \* \*